US012772320B1

(12) United States Patent
Gaffney et al.

(10) Patent No.: US 12,772,320 B1
(45) Date of Patent: Oct. 20, 2026

(54) METHODS FOR MANAGING COMMUNICATION IN IOT DEVICES ACROSS NETWORKS

(71) Applicant: Geotab Inc., Oakville (CA)

(72) Inventors: Benjamin John Gordon Gaffney, Wellesley (CA); Kathryn Lynch, Toronto (CA); Yash Agrawal, Toronto (CA); Samuel Thomas MacKenzie, Toronto (CA); Jonathan Bean, Arvada, CO (US); Thomas Randall Wolfgang, Denver, CO (US); James Edward Grohoski, III, Denver, CO (US)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/637,412

(22) Filed: Apr. 2, 2026

Related U.S. Application Data

(60) Provisional application No. 63/881,984, filed on Sep. 15, 2025.

(51) Int. Cl.
*H04W 76/19* (2018.01)
*H04W 8/08* (2009.01)
*H04W 64/00* (2009.01)

(52) U.S. Cl.
CPC ............. *H04W 76/19* (2018.02); *H04W 8/08* (2013.01); *H04W 64/006* (2013.01)

(58) Field of Classification Search
CPC ..... H04W 76/19; H04W 8/08; H04W 64/006; H04W 72/56; H04W 72/541; H04W 72/542; H04W 72/0453; H04W 72/046; H04W 72/54; H04W 4/02; H04W 4/38; H04W 72/04; H04W 72/21; H04W 4/90; H04W 72/20; H04W 16/18; H04W 64/003; H04W 52/243; H04W 4/025; H04W 84/042; H04W 84/12; H04W 72/52; H04W 4/027; H04W 52/146; H04W 72/51; H04W 48/06; H04W 40/248; H04W 36/12; H04W 52/0245; H04W 52/0258; H04W 52/241; H04W 52/245; H04W 4/50; H04W 52/14; H04W 72/1215; H04W 60/04; H04W 72/1268; H04W 72/563; H04W 12/63; H04W 16/08; H04W 16/22; H04W 28/0236; H04W 28/0247; H04W 28/0268;
(Continued)

(56) References Cited

U.S. PATENT DOCUMENTS 6,522,267 B2 2/2003 Flick
6,647,270 B1 11/2003 Himmelstein
(Continued)

FOREIGN PATENT DOCUMENTS

WO 2023240262 A1 12/2023

*Primary Examiner* — Nimesh Patel
(74) *Attorney, Agent, or Firm* — Sherif Abdel-Kader

(57) ABSTRACT

Methods, devices, and systems for managing communication in IoT devices across terrestrial and satellite networks are described. An IoT device may transition between a main wireless network and an auxiliary wireless network upon connectivity loss, ensuring uninterrupted data transmission. Data may be buffered and transmitted at configurable intervals, leveraging simplified location path data generated by a Ramer-Douglas-Peucker (RDP) algorithm. In some implementations, the system is employed for asset tracking. In other implementations, the system is employed for telematics.

20 Claims, 10 Drawing Sheets

(58) Field of Classification Search
CPC ......... H04W 28/0289; H04W 28/0865; H04W 36/0061; H04W 36/06; H04W 36/08; H04W 36/00835; H04W 36/0079; H04W 36/0069; H04W 36/20; H04W 36/302; H04W 36/322; H04W 36/324; H04W 40/12; H04W 40/20; H04W 48/04; H04W 8/245; H04W 8/22; H04W 12/121; H04W 24/04; H04W 8/20; H04W 8/24; Y02D 30/70; H04B 7/0408; H04B 17/318; H04B 17/345; H04B 17/27; H04B 7/0413; H04B 1/715; H04B 2203/5441; H04B 7/15585; H04L 1/0026; H04L 67/12; H04L 1/1887; H04L 1/0003; H04L 12/189; H04L 41/0894; H04L 65/80; H04L 5/00; H04L 67/34; H04L 12/46; H04L 63/0209; H04L 63/10; H04L 41/046; H04L 2209/80; H04L 41/5067; H04L 41/0663; H04L 9/40; H04L 63/0435; H04M 1/72406; H04M 1/72412; H04M 11/00; H04M 1/72463; G06F 8/65; G06F 11/1433; G06F 2221/2113; G06F 21/53; G06F 11/1479; G06F 16/23; G06F 21/602
See application file for complete search history.

(56) References Cited

U.S. PATENT DOCUMENTS 6,765,499 B2 7/2004 Flick
7,058,040 B2 6/2006 Schmidt
7,188,026 B2 3/2007 Tzamaloukas
7,260,153 B2 8/2007 Nissani et al.
7,450,955 B2 11/2008 Himmelstein
7,522,594 B2 4/2009 Piche et al.
7,551,677 B2 6/2009 Crawford
7,602,784 B2 10/2009 Piche et al.
7,684,807 B2 3/2010 Schmidt
7,742,388 B2 6/2010 Shearer et al.
7,747,291 B2 6/2010 Himmelstein
7,907,976 B2 3/2011 Himmelstein
8,600,422 B2 12/2013 Himmelstein
8,965,695 B2 2/2015 Tzamaloukas
9,445,270 B1 9/2016 Bicket et al.
10,057,777 B2 8/2018 Li et al.
10,085,149 B2 9/2018 Bicket et al.
10,206,107 B2 2/2019 Bicket et al.
10,390,227 B2 8/2019 Bicket et al.
10,484,848 B2 11/2019 Cavalcanti et al.
10,587,366 B2 3/2020 Chervyakov et al.
10,756,869 B2 8/2020 Khoryaev et al.
10,827,324 B1 11/2020 Hajimiri et al.
10,999,269 B2 5/2021 Bicket et al.
11,019,553 B1 5/2021 Bhambhani et al.
11,122,488 B1 9/2021 Lloyd et al.
11,190,373 B1 11/2021 Stevenson et al.
11,356,909 B1 6/2022 Lloyd
11,431,537 B2 8/2022 Khoryaev et al.
11,432,135 B2 8/2022 Shan
11,432,220 B2 8/2022 Xu et al.
11,452,115 B2 9/2022 Khoryaev et al.
11,516,749 B2 11/2022 Scholand et al.
11,553,503 B2 1/2023 Parron et al.
11,595,995 B2 2/2023 Khoryaev et al.
11,601,919 B2 3/2023 Ye et al.
11,606,736 B1 3/2023 Lloyd et al.
11,646,822 B2 5/2023 Zhang et al.
11,659,060 B2 5/2023 Davis et al.
11,670,116 B2 6/2023 Davidson
11,671,907 B2 6/2023 Kedalagudde et al.
11,688,211 B1 6/2023 Calmer et al.
11,710,355 B1 7/2023 Wenneman et al.
11,711,176 B2 7/2023 Khoryaev et al.
11,736,312 B1 8/2023 Xiao et al.
11,855,801 B1 12/2023 Stevenson et al.
11,910,263 B2 2/2024 Xu et al.
11,917,040 B1 2/2024 Mendez Rodriguez et al.
11,930,082 B1 3/2024 Singh et al.
11,950,182 B2 4/2024 Stojanovski et al.
11,956,782 B2 4/2024 Shilov et al.
11,997,181 B1 5/2024 Davis et al.
11,997,530 B2 5/2024 Ali et al.
11,997,741 B1 5/2024 Francis et al.
12,004,111 B2 6/2024 Shan
12,028,289 B2 7/2024 Ye et al.
12,028,884 B2 7/2024 Panteleev et al.
12,041,583 B2 7/2024 Ye et al.
12,041,600 B2 7/2024 Mueck et al.
12,052,602 B2 7/2024 Ali et al.
12,052,743 B2 7/2024 Panteleev et al.
12,058,562 B2 8/2024 Khoryaev et al.
12,063,505 B2 8/2024 Guo et al.
12,063,657 B2 8/2024 Panteleev et al.
12,089,278 B2 9/2024 Wu et al.
12,113,746 B2 10/2024 Panteleev et al.
12,120,581 B1 10/2024 Gal et al.
2006/0276199 A1 12/2006 Flick
2018/0255175 A1* 9/2018 Tran ...................... H04W 8/245
2019/0132839 A1* 5/2019 Li .......................... H04W 74/04
2019/0206150 A1 7/2019 Zucconelli et al.
2021/0092785 A1* 3/2021 Patel ..................... H04W 8/005
2021/0120595 A1 4/2021 Singh et al.
2021/0136699 A1 5/2021 Scholand et al.
2021/0195386 A1 6/2021 Hajimiri et al.
2022/0070699 A1* 3/2022 Thiyagarajan ........ H04W 24/04
2022/0159628 A1 5/2022 Bangolae et al.
2022/0311582 A1 9/2022 Ye et al.
2022/0417820 A1 12/2022 Xu et al.
2023/0125160 A1 4/2023 Sirotkin et al.
2023/0144397 A1 5/2023 Ye et al.
2023/0156792 A1 5/2023 Yao et al.
2023/0171314 A1 6/2023 Onti Srinivasan et al.
2023/0209553 A1 6/2023 Ye et al.
2024/0003749 A1 1/2024 Lin et al.
2024/0096139 A1 3/2024 Mesde et al.
2024/0098746 A1 3/2024 Ye et al.
2024/0146629 A1 5/2024 Lloyd
2024/0217555 A1 7/2024 Shin
2024/0224235 A1 7/2024 Miao
2024/0333802 A1 10/2024 Mesde et al.
2024/0345274 A1* 10/2024 Moore ................... G01V 3/081

* cited by examiner

METHODS FOR MANAGING COMMUNICATION IN IOT DEVICES ACROSS NETWORKS

RELATED APPLICATIONS

This application claims priority from U.S. provisional application 63/881,984 filed on Sep. 15, 2025, the contents of which are herein incorporated by reference in their entirety.

TECHNICAL FIELD

The present disclosure generally relates to Internet-of-Things (IoT) technologies, and more specifically to methods for managing communication in IoT devices across terrestrial and satellite networks.

BACKGROUND

Internet of Things (IoT) devices, such as asset trackers and telematics devices, are widely used to remotely monitor and report the status and location of equipment, vehicles, and other assets. These devices typically rely on terrestrial cellular networks to transmit sensor data and operational insights to centralized servers for analysis and management. In many applications, asset trackers are installed on trailers, shipping containers, or construction equipment. Telematics devices are integrated into vehicles to collect engine hours, odometer readings, and other performance metrics. However, these devices may encounter challenges when deployed in remote areas, or environments with limited or intermittent cellular coverage. Such conditions can result in data transmission gaps, delayed reporting, and incomplete records, which may hinder asset management, regulatory compliance, and operational efficiency.

SUMMARY

In one aspect of the present disclosure, there is provided a method for managing communication by an Internet-of-Things device powered by a wired source, comprising establishing a connection to a main wireless network, when the received signal drops below a predetermined signal strength on the main network, roaming to the auxiliary network, upon roaming to the auxiliary wireless network uploading data stored in a buffer to a remote server, recording a status indicating operation on the auxiliary wireless network, and preventing firmware-over-the-air updates, and while connected to the auxiliary wireless network at a configured interval uploading a first set of data comprising priority-1 data including at least an instantaneous location indicator, and buffering a second set of data comprising trajectory Global Navigation Satellite System data, and upon roaming back to the main wireless network uploading the buffered second set of data. This ensures uninterrupted situational awareness under constrained links and restores full-fidelity records when primary connectivity resumes.

The configured interval may be selected based on movement state, including while movement is detected uploading the first set of data at a first interval and while stationary uploading the first set of data at a second interval, wherein each interval is remotely configurable. This improves operational relevance and bandwidth efficiency.

The method for managing communication by an Internet-of-Things device powered by a wired source may further comprise periodically attempting to roam back to the main wireless network while connected to the auxiliary wireless network. This secures timely restoration to lower-cost connectivity.

Buffering the trajectory Global Navigation Satellite System data may comprise simplifying the trajectory using a Ramer-Douglas-Peucker algorithm prior to storage. This reduces storage footprint and deferred upload size while preserving essential path shape. Recording a status indicating operation on the auxiliary wireless network may comprise emitting a first status indicator upon roaming to the auxiliary wireless network and a second status indicator upon resuming the main wireless network. This improves operator awareness of network mode and transition history.

The method for managing communication by an Internet-of-Things device powered by a wired source may further comprise estimating data usage over the auxiliary wireless network based on payload size and a transport-overhead factor, and, upon reaching a threshold, reducing an upload cadence and/or restricting payload composition to remain within a configured budget. This ensures compliance with carrier quotas.

The method for managing communication by an Internet-of-Things device powered by a wired source may further comprise enforcing a data budget over the auxiliary wireless network based on counters obtained from the network interface or a network service. This secures predictable monthly usage and avoids service interruption.

While connected to the auxiliary wireless network the device may maintain network registration but transmit uplinks only at the configured interval. This reduces idle signaling overhead while sustaining scheduled reporting.

While connected to the auxiliary wireless network the device may disconnect and reconnect at each configured interval to reduce overhead between uplinks. This improves data efficiency when periodic attachment minimizes non-payload traffic.

The first set of data may comprise priority-1 data that includes at least an instantaneous location indicator and at least one of ignition state, external line-in voltage, temperature, or device health. This ensures critical insights are delivered under constrained bandwidth.

The method for managing communication by an Internet-of-Things device powered by a wired source may further comprise applying per-device randomized staggering to scheduled transmissions over the auxiliary wireless network within a bounded tolerance to reduce gateway congestion. This reduces contention and stabilizes ingress loads.

The method for managing communication by an Internet-of-Things device powered by a wired source may further comprise, when a high-frequency reporting mode is enabled, maintaining priority-1-only payloads while decreasing the configured interval subject to a monthly data budget over the auxiliary wireless network. This improves responsiveness to urgent events without overrunning quota.

The device may refrain from performing firmware-over-the-air updates until after reconnection to the main wireless network and completion of uploading buffered data. This secures auxiliary-network bandwidth for operational telemetry.

The device may refrain from performing firmware-over-the-air updates until after reconnection to the main wireless network and completion of uploading buffered data. This secures auxiliary-network bandwidth for operational telemetry.

When the received signal drops below a predetermined signal strength on the main network, roaming to the auxiliary network may comprise scanning for available networks via the network interface and, upon failing to attach to the main wireless network including roaming partners, initiating attachment to the auxiliary wireless network. This improves resilience to coverage gaps.

The method for managing communication by an Internet-of-Things device powered by a wired source may further comprise executing the method only when the device is powered by a wired power source detected by a power module, and, when powered by a battery, operating in a battery reporting mode that transmits at lower frequencies independent of the auxiliary wireless network. This ensures energy-appropriate behavior across power states.

The device buffers debug and diagnostics data designated as priority-3 during operation on the auxiliary wireless network and uploads the buffered priority-3 data upon reconnection to the main wireless network in accordance with a configured policy. This improves post-event analysis without burdening constrained links.

While on the auxiliary wireless network, dynamically adjusting the composition of the priority-1 data may be based on a data budget, including pruning optional priority-1 fields and/or coalescing multiple events into summarized values, while retaining an instantaneous location indicator and at least one critical indicator selected from ignition state, external line-in voltage, temperature, or device health. This ensures minimum situational awareness while adapting payload size to quota.

The main wireless network may be a terrestrial cellular network. This improves clarity of common deployment contexts.

The auxiliary wireless network may be a direct-to-cell satellite network comprised of Low Earth Orbit satellites. This secures coverage continuity in remote environments. In another aspect of the present disclosure, there is provided an Internet-of-Things device comprising a network interface, a controller, and a memory storing instructions that, when executed by the controller, cause the device to detect loss of a connection to a main wireless network and connect to an auxiliary wireless network, upon roaming to the auxiliary wireless network upload buffered data, record a status indicating operation on the auxiliary wireless network, and prevent firmware-over-the-air updates, while on the auxiliary wireless network at a configured interval upload priority-1 data and buffer trajectory Global Navigation Satellite System data, and upon reconnection to the main wireless network upload the buffered trajectory Global Navigation Satellite System data. This improves continuity and bandwidth discipline across heterogeneous networks.

The Internet-of-Things device comprising a network interface, a controller, and a memory storing instructions may further comprise a power module configured to detect wired power availability and to enable behavior for the auxiliary wireless network only when wired power is available. This ensures higher reporting throughput only when sufficient energy is available.

The network interface may be a 3GPP-compliant cellular modem of Category 1bis or higher. This improves attachment reliability and standardized band support. A Global Navigation Satellite System receiver may be configured to provide instantaneous location indicators and trajectory Global Navigation Satellite System data. This ensures accurate positioning and path capture.

The memory may store instructions to simplify trajectory Global Navigation Satellite System data using a Ramer-Douglas-Peucker algorithm prior to buffering. This reduces storage and deferred payload volume while preserving path characteristics. The controller may be further configured to obtain data-usage metrics from the network interface (e.g., wireless modem) and enforce a configured monthly budget over the auxiliary wireless network. This secures adherence to carrier limits.

The controller may be further configured to maintain registration to the auxiliary wireless network but schedule uplink transmissions only at the configured interval. This reduces idle signaling overhead.

The uploaded priority-1 data may include at least an instantaneous location indicator and at least one of ignition state, external line-in voltage, temperature, or device health. This ensures critical payload composition under constraints.

The memory may store instructions that cause the controller, while on the auxiliary wireless network, to buffer debug and diagnostics data designated as priority-3 in non-volatile memory and, upon reconnection to the main wireless network, to upload the buffered priority-3 data in accordance with a configured policy. This improves diagnostics handling without impacting constrained uplinks.

The controller may be further configured, while on the auxiliary wireless network, to dynamically adjust the composition of priority-1 payloads responsive to a data budget by pruning optional priority-1 fields and/or coalescing multiple events into summarized values, while retaining an instantaneous location indicator and at least one critical indicator selected from ignition state, external line-in voltage, temperature, or device health. This improves quota adherence while retaining essential awareness.

The main wireless network may be a terrestrial cellular network. This ensures a widely deployed embodiment.

The auxiliary wireless network may be a direct-to-cell satellite network comprised of Low Earth Orbit satellites. This improves reach in remote areas.

In yet another aspect of the present disclosure, there is provided a system comprising the Internet-of-Things device, a main wireless network, an auxiliary wireless network interconnected to a core network, and a server configured to receive the recorded status indicating operation on the auxiliary wireless network, receive periodic priority-1 data uploads while the device is on the auxiliary wireless network, and receive buffered trajectory Global Navigation Satellite System data upon reconnection to the main wireless network. This improves end-to-end ingestion, visualization, and reconciliation of realtime and deferred telemetry.

The server may be configured to display an auxiliary-network-in-use indicator in a user interface responsive to receiving the recorded status. This ensures clear UI signaling for operators.

The server may be configured to accept deferred uploads of trajectory Global Navigation Satellite System data and to reconstruct a path visualization upon receipt of the buffered data. This improves historical path fidelity after constrained operation.

The server may enforce randomized staggering windows for auxiliary-network-originating uploads across a fleet of devices to mitigate gateway congestion. This reduces peak contention and stabilizes ingress.

The server may store configuration parameters defining the configured interval for uploads over the auxiliary wireless network for movement and stationary states and transmit the parameters to the device. This improves centralized cadence control aligned to asset activity.

In a further aspect of the present disclosure, there is provided that the main wireless network is a terrestrial cellular network. This secures a widely deployed embodiment. In a further aspect of the present disclosure, there is provided that the auxiliary wireless network is a direct-to-cell satellite network comprised of Low Earth Orbit satellites. This improves coverage continuity in remote regions.

DETAILED DESCRIPTION

Figure 1:
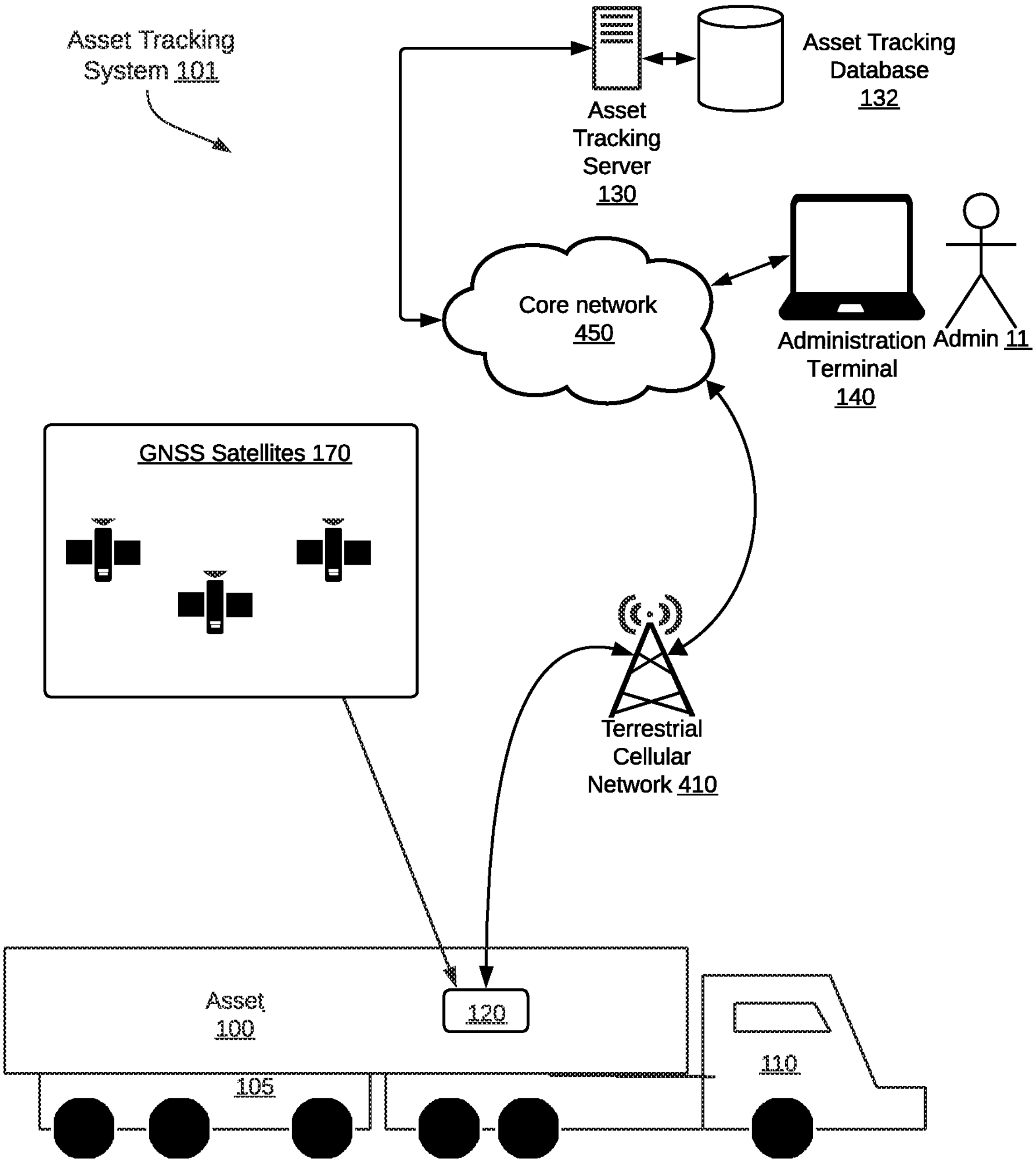
FIG. 1 is a system diagram illustrating the communication architecture of an asset tracking system using IoT devices across terrestrial cellular and satellite networks.

The following detailed description provides various embodiments and examples of the disclosed subject matter, which generally pertains to methods, devices, and systems for managing communication in Internet-of-Things (IoT) devices across terrestrial and satellite networks. The disclosed subject matter is particularly applicable to scenarios where IoT devices, such as asset trackers and telematics devices, operate in environments with intermittent or limited terrestrial cellular coverage, enabling seamless connectivity and reliable data transmission through auxiliary satellite networks.

The embodiments and examples described herein are provided for illustrative purposes only and are not intended to limit the scope of the subject matter disclosed. Certain well-known components, processes, and techniques may not be described in detail to avoid obscuring the subject matter, as they are readily understood by those skilled in the art. Furthermore, various modifications, substitutions, and rearrangements of the described elements and methods may be made without departing from the scope of the subject matter, as defined by the appended claims.

The proliferation of Internet-of-Things (IoT) devices, such as asset trackers and telematics systems, has transformed industries by enabling remote monitoring and management of assets. These devices typically rely on terrestrial cellular networks for communication, transmitting important data such as location, engine hours, and environmental metrics to centralized servers for analysis. However, conventional systems face significant challenges in environments with limited or intermittent cellular coverage, such as remote highways, mountainous regions, or disaster-stricken areas where terrestrial infrastructure is unavailable. In such scenarios, IoT devices experience service disruptions, data transmission gaps, and incomplete records, which hinder real-time asset visibility, operational decision-making, and regulatory compliance. Furthermore, existing solutions often fail to address the need for effective data management and prioritization when operating under constrained network conditions, such as satellite networks with limited bandwidth.

The present disclosure addresses these limitations by introducing methods and systems for managing communication in IoT devices across a main wireless network and an auxiliary wireless network. The described concept enables seamless connectivity and reliable data transmission by leveraging the auxiliary wireless network as a fallback communication channel when the main wireless network is unavailable. Unlike conventional approaches, the disclosed system incorporates intelligent network-switching mechanisms, data prioritization algorithms, and adaptive operational modes tailored to the power source and prevailing network conditions. For instance, when an IoT device when the received signal drops below a predetermined signal strength on the main network, the device roams to the auxiliary network, uploading buffered data and maintaining reporting functionalities. Specialized algorithms, such as the Ramer-Douglas-Peucker (RDP) algorithm, are employed to simplify location trajectory data, reducing payload size while preserving necessary information. Additionally, the system dynamically adjusts data transmission behavior based on constraints associated with the auxiliary wireless network, prioritizing high-value data such as instantaneous location indicators, ignition status, and engine hours, while buffering less significant data for later transmission upon reconnection to the main wireless network.

For clarity of explanation, a terrestrial cellular network is used herein as an example of the main wireless network, and a direct-to-cell satellite network comprising Low Earth Orbit satellites is used as an example of the auxiliary wireless network; however, the invention is not limited to these examples and encompasses any main wireless network able to provide primary connectivity and any auxiliary wireless network suitable for fallback communication, including but not limited to non-terrestrial networks, private cellular deployments, and other wide-area wireless services, provided the coordinated behaviors described—network switching, status signaling, suppression of firmware-over-the-air updates on the auxiliary network, priority-based uplinks, buffering of trajectory GNSS, and re-initialization upon return—are implemented.

The described system enhances device operation by introducing distinct modes tailored for wired and battery-powered configurations. In wired mode, the IoT device operates with increased reporting frequency and maintains continuous network connectivity, facilitating real-time data delivery. On the other hand, in battery mode, the device employs power-saving strategies, reducing data transmission frequency and utilizing event-driven reporting to conserve energy. These adaptive modes contribute to extended device lifespan and improved operational performance, particularly in remote or resource-limited environments. By incorporating these advanced features, the disclosed system offers a reliable approach for maintaining uninterrupted communication, improving asset visibility, and addressing limitations associated with existing technologies in satellite networks.

In this disclosure, the following terms and definitions are used.

Asset Tracker—A type of IoT device used to monitor the location and status of assets such as vehicles, equipment, or shipping containers. It collects and transmits data to a centralized server for analysis and management.

Telematics Device—An IoT device integrated into vehicles or equipment to collect and transmit operational data usually captured from an interface port, such as an On-Board Diagnostic (OBD) port.

Direct-to-Cell (DTC) Satellite Network—A communication network comprising Low Earth Orbit (LEO) satellites that enable IoT devices to connect directly to satellites, bypassing terrestrial cellular networks, particularly in areas with limited or no cellular coverage.

Terrestrial Cellular Network (TCN)—A ground-based wireless communication network that includes technologies such as 2G, 3G, 4G, 5G, and NB-IoT, used for transmitting data from IoT devices to centralized servers.

GNSS (Global Navigation Satellite System)—A satellite-based navigation system that provides geolocation and time information to IoT devices. Examples include GPS, GLONASS, Galileo, and BeiDou.

GNSS trajectory data or Curve GNSS Logs—Detailed location data points collected by an IoT device to represent the movement path of an asset. These logs are often simplified using algorithms to reduce data size.

Ramer-Douglas-Peucker (RDP) Algorithm—A data simplification algorithm used to reduce the number of points in a curve while preserving its essential shape. In this disclosure the RDP algorithm is applied to GNSS trajectory data.

Engine Hours—The cumulative duration of time an asset's engine is operational, calculated based on ignition ON/OFF events.

Odometer Data—Data representing the distance traveled by an asset, usually obtained from a vehicle via an interface port thereof.

Heartbeat GNSS Updates—Periodic location updates provided by an IoT device when the asset is stationary, ensuring minimal data transmission.

Communication Interval—A configurable time interval during which an IoT device establishes a connection with a remote server to upload stored data.

Firmware Over-The-Air (FOTA) Updates—Remote updates to the firmware of an IoT device, typically disabled during DTC operation to conserve bandwidth.

Priority Data—Categorized data types transmitted by an IoT device based on importance. Priority 1 includes critical data such as instantaneous location and ignition status, Priority 2 includes trajectory GNSS logs, and Priority 3 includes debug data.

Buffered Data—Data temporarily stored in the memory of an IoT device when immediate transmission is not possible, such as during DTC operation.

Low Earth Orbit (LEO) Satellites—Satellites orbiting closer to Earth than geostationary satellites, providing lower latency and faster communication speeds for DTC networks.

Battery Mode—An operational mode of an IoT device powered solely by its internal battery, employing energy-saving strategies such as reduced data transmission frequency.

Wired Mode—An operational mode of an IoT device powered by an external wired energy source, enabling higher data transmission frequency and continuous operation. Examples of an external energy source include a vehicle's battery and a reefer alternator.

Stationary Asset—An asset that remains in a fixed location for most of its service life, such as generators or concrete mixers, where engine hours are prioritized over location data.

Moving Asset—An asset that spends a significant portion of its service life in motion, such as trailers or shipping containers, where odometer data and detailed location tracking are critical.

Impact Event—A significant physical event detected by an IoT device, such as a collision or drop, triggering the logging of GNSS location, accelerometer readings, and event time.

High Frequency Update—A mode enabling an IoT device to report data more frequently, typically used during theft events or other critical scenarios.

Last Known GNSS Location—The most recent geolocation data point transmitted by an IoT device, used during extended DTC operation when detailed trajectory data is buffered.

Data Restriction—A mechanism to limit data usage by an IoT device while operating on a DTC network, ensuring compliance with carrier-defined bandwidth limits.

Non-Volatile Memory—Memory used in IoT devices to store data persistently, even when the device is powered off.

Debug Data—Diagnostic information collected by an IoT device to assist in troubleshooting and system analysis, categorized as Priority 3 data.

Collision Data—Data logged by an IoT device during an impact event, including GNSS location and accelerometer readings.

Computed Odometer—A virtual odometer calculated by an IoT device using GNSS data to estimate the distance traveled by an asset.

Ignition Insights—Data related to the operational status of an asset's engine, including ignition ON/OFF events and engine hours.

Data Payload Formation—A snapshot of data compiled by an IoT device for transmission during a Communication Interval.

Gateway Congestion Management—Techniques used to reduce network congestion by adjusting the timing of data uploads from IoT devices.

Extended DTC Operation—A mode of operation for IoT devices on DTC networks lasting beyond an initial period, during which detailed trajectory data is buffered and only critical data is transmitted.

Transitioning Modes—The process by which an IoT device switches between terrestrial cellular networks and DTC satellite networks, ensuring seamless connectivity.

Full-Fidelity Data—Comprehensive and detailed data transmitted by an IoT device without simplification or reduction, such as full-fidelity odometer and engine hours data.

Simplified Location Data—Location data processed using algorithms like RDP to reduce the number of data points while preserving essential trajectory information.

Examples of an IoT device as described herein include, but are not limited to, an asset tracker and a telematics device. An asset tracker is typically used within an asset tracking system to monitor the location and status of various assets, such as vehicles, equipment, or shipping containers. A telematics device, on the other hand, is commonly integrated into vehicles or equipment to collect and transmit operational data, including engine hours, odometer readings, and other performance metrics. Both types of devices benefit from the disclosed methods and systems for managing communication across diverse network environments.

FIG. 1 depicts an asset tracking system 101, which is designed to monitor and manage remote assets such as vehicles, equipment, or shipping containers. The system includes an asset 100, which may be any type of asset requiring tracking, and an asset tracker 120 deployed within or attached to the asset 100. The asset 100 is in the form of a shipping container placed on a trailer 105 connected to a truck 110. The asset tracker 120 is responsible for collecting and reporting the location and status of the asset 100. The asset tracker 120 communicates with an asset tracking server 130, which serves as the central hub for receiving, storing, and analyzing asset tracking data. The asset tracking server 130 is connected to a core network 450, which acts as the backbone for data transmission and routing between the asset tracker 120 and the asset tracking server 130. The asset tracking server 130 utilizes an asset tracking database 132 for persistent storage and retrieval of historical and real-time information.

The core network 450 is, in turn, connected to a terrestrial cellular network 410, which provides the wireless communication link between the distributed asset tracker 120 and the centralized asset tracking server 130. The terrestrial cellular network 410 may include any known type of cellular network, such as 2G (GSM, GPRS, EDGE), 3G (UMTS, HSPA), 4G (LTE), 5G, or NB-IoT (Narrowband Internet of Things), offering a range of coverage and data transmission capabilities to suit different deployment scenarios. In some implementations, the core network 450 also routes server responses and administrative traffic to user endpoints and provides secure peering to cloud services that host the asset tracking server 130 and asset tracking database 132.

The system further includes an administration terminal 140, which allows users, such as fleet managers or system administrators, to access the asset tracking server 130. Through the administration terminal 140, users can monitor real-time asset status, review historical data, configure reporting parameters, and generate analytics or compliance reports. The administration terminal 140 may be a computer workstation, tablet, smartphone, or other network-connected device, and is shown operated by an administrator 11 to indicate the human actor interacting with the system's user interface.

Additionally, the system is supported by Global Navigation Satellite System (GNSS) satellites 170, which are part of a GNSS network. The GNSS network enables the asset tracker 120 to determine its precise geographic location. Examples of GNSS networks include the Global Positioning System (GPS), GLONASS, Galileo, BeiDou, as well as regional systems such as QZSS (Quasi-Zenith Satellite System) and IRNSS/NavIC (Indian Regional Navigation Satellite System). The GNSS signals are received by the asset tracker 120 to compute position, speed, and heading for reporting to the asset tracking server 130.

In operation, the asset tracker 120 collects location and status data from the asset 100, determines its position using signals from the GNSS satellites 170, and transmits this information via the terrestrial cellular network 410 and core network 450 to the asset tracking server 130. The asset tracking server 130 processes and stores the data in the asset tracking database 132, enabling real-time asset visibility and management through the administration terminal 140 operated by the administrator 11. However, in the absence of cellular coverage from the terrestrial cellular network 410, there will be a disruption in service, and the asset tracker 120 will not be able to communicate with the asset tracking server 130. This results in gaps in asset visibility and data reporting, which can hinder effective asset management and operational decision-making, until connectivity is restored via the core network 450 and the asset tracking server 130 resumes ingesting telemetry.

Figure 2:
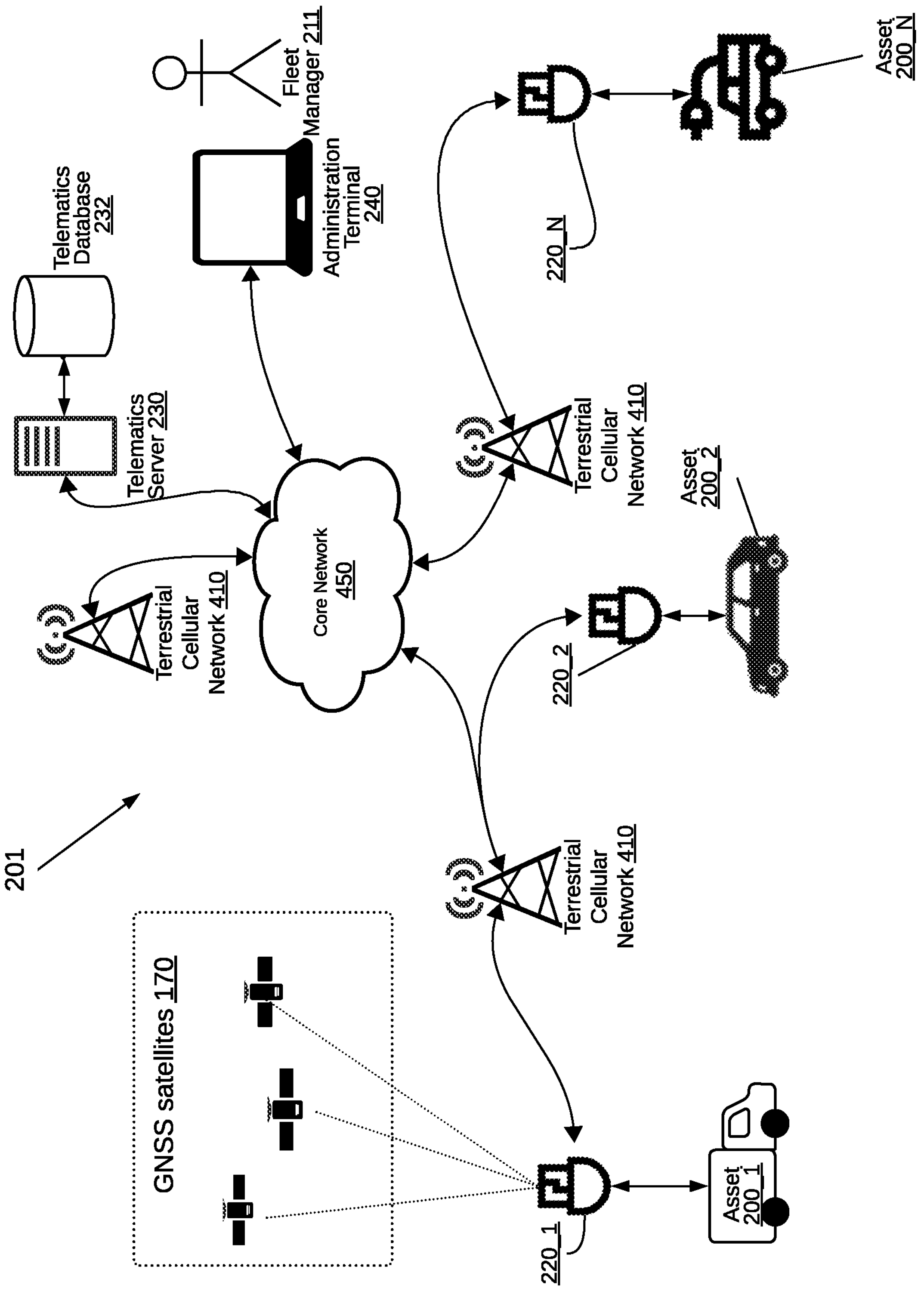
FIG. 2 is a system diagram illustrating the communication flow among tracked assets, terrestrial cellular networks, a central network, and telematics infrastructure.

FIG. 2 depicts a telematics system 201, which is designed to monitor, manage, and analyze data from a fleet of assets 200, such as vehicles, equipment, or other mobile or stationary resources. Each asset 200 is equipped with a telematics device 220, which is responsible for collecting a wide range of operational and location data, including but not limited to engine hours, odometer readings, sensor data, and GPS-based position information. The telematics devices 220 are shown as 220_1, 220_2, up to 220_N, each corresponding to a different asset 200_1, 200_2, up to 200_N, illustrating the scalability of the system to support large fleets.

The telematics devices 220 communicate with a telematics server 230, which serves as the central hub for receiving, storing, and processing telematics data from all assets in the system. The telematics server 230 is connected to a core network 450, which acts as the backbone for data transmission and routing between the telematics devices 220 and the telematics server 230. The core network 450 is, in turn, connected to the terrestrial cellular network 410, which provides the wireless communication link between the telematics devices 220 and the telematics server 230. The terrestrial cellular network 410 may include any known type of cellular network, such as 2G (GSM, GPRS, EDGE), 3G (UMTS, HSPA), 4G (LTE), 5G, or NB-IoT (Narrowband Internet of Things), offering a range of coverage and data transmission capabilities to suit different deployment scenarios.

The system further includes an administration terminal 240, which provides fleet managers or system administrators with access to the telematics server 230. Through the administration terminal 240, users can monitor real-time asset status, review historical data, configure reporting parameters, and generate analytics or compliance reports. The administration terminal 240 is typically a computer workstation, but may also be a tablet, smartphone, or other network-connected device.

The telematics server 230 is also connected to a telematics database 232, which stores all collected data for long-term analysis, regulatory compliance, and historical reporting.

The system is further supported by GNSS satellites 170, which are part of a GNSS network. The GNSS network enables the telematics devices 220 to determine precise geographic locations for the assets 200. Examples of GNSS networks include the Global Positioning System (GPS), GLONASS, Galileo, BeiDou, as well as regional systems such as QZSS (Quasi-Zenith Satellite System) and IRNSS/NavIC (Indian Regional Navigation Satellite System).

In operation, a telematics device 220 collects operational and location data from its associated asset 200 and transmits this information via the terrestrial cellular network 410 and core network 450 to the telematics server 230. The telematics server 230 processes, stores, and analyzes the data, making it available to a fleet manager 211 through the administration terminal 240. This enables real-time monitoring, efficient fleet management, and data-driven decision-making.

However, in the absence of cellular coverage from the terrestrial cellular network 410, there will be a disruption in service, and the telematics device 220 will not be able to communicate with the telematics server 230. This results in gaps in data reporting and asset visibility, which can impact fleet operations, compliance, and overall decision-making.

Figure 3:
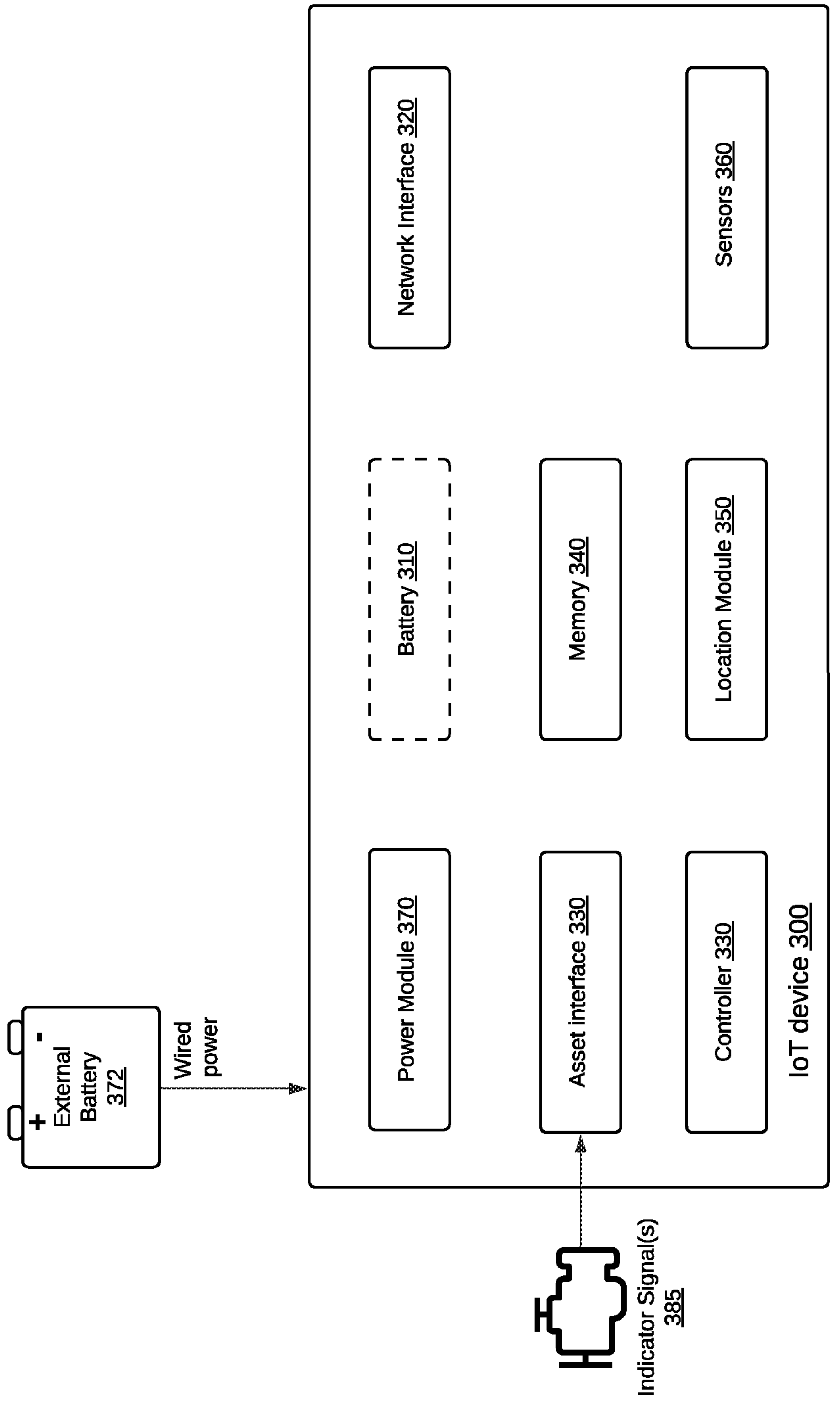
FIG. 3 is a block diagram illustrating the components of an IoT device.

FIG. 3 depicts an exemplary IoT device 300, which is suitable for deployment in a wide range of assets, such as vehicles, equipment, shipping containers, or other movable or stationary resources. The IoT device 300 is comprised of several key components that enable it to collect, process, and transmit asset data reliably across diverse environments.

The device includes a battery 310, which may be a non-rechargeable or rechargeable battery, providing backup or primary power to the device. In some implementations, the battery 310 may be a lithium-thionyl chloride (Li—SOCl2) battery, known for its long shelf life and wide operating temperature range, or a lithium-manganese dioxide (Li—MnO2) battery. The battery 310 ensures that the IoT device 300 can continue to operate even when external power is unavailable.

A network interface 320 is provided to enable wireless communication with external networks. The network interface 320 may be a cellular modem supporting various cellular technologies, such as 2G (GSM, GPRS, EDGE), 3G (UMTS, HSPA), 4G (LTE), 5G, or NB-IoT (Narrowband Internet of Things). In some embodiments, the network interface 320 may also support non-cellular wide area network technologies, such as LoRaWAN or WiMAX, or even direct-to-cell (DTC) satellite communication for global coverage.

The controller 330 is a microprocessor, microcontroller, or system-on-chip (SoC) that executes machine-executable programming instructions to manage the operation of the device. The controller 330 is responsible for processing sensor data, managing network connections, handling data buffering, and executing communication protocols.

Coupled to the controller 330 is a memory 340, which stores programming instructions, configuration parameters, and collected asset data. The memory 340 may include non-volatile memory, such as flash memory or EEPROM, for persistent storage, as well as volatile memory, such as SRAM or DRAM, for temporary data processing.

A location module 350 is integrated into the device to determine the geographic position of the asset. The location module 350 may be a GNSS receiver capable of receiving signals from multiple satellite constellations, such as GPS (Global Positioning System), GLONASS, Galileo, BeiDou, QZSS, or IRNSS/NavIC. This enables the device to provide accurate and reliable location data in a variety of global regions.

The IoT device 300 may also include one or more sensors 360, which can be used to monitor asset conditions or environmental parameters. Examples of sensors 360 include motion sensors (accelerometers, gyroscopes), temperature sensors, humidity sensors, pressure sensors, light sensors, or even specialized sensors for detecting asset-specific events, such as door open/close status or cargo temperature.

A power module 370 is included to manage the supply of power from external wired sources, such as an external battery 372 and the battery 310. The power module 370 may include power filtering, surge protection, and voltage regulation circuitry to ensure stable and safe operation of the device. It may also include a power path multiplexer to switch between external power and the internal battery as needed.

The device further includes an indicator signal interface 385, which is used to receive status signals from the asset, such as ignition on/off, engine status, or other operational indicators. This interface allows the device to correlate asset activity with collected data, enhancing the value of the information reported to remote servers.

An external battery 372 is depicted as an example of an external power source that may be used to supply power to the device, particularly in vehicle or equipment installations. The external battery 372 has a high capacity and is typically recharged by a generator or alternator. As such, to the IoT device 300, the external battery 372 represents a power source that can always provide power to the IoT device 300.

The IoT device 300 is designed to operate autonomously, collecting, processing, buffering, and transmitting asset data to remote servers via the network interface 320. The integration of these components enables robust asset tracking, telematics, and condition monitoring, supporting a wide range of applications in fleet management, logistics, equipment monitoring, and beyond.

A significant problem faced by asset tracking and telematics systems is the loss of cellular coverage from the main wireless network, such as the terrestrial cellular network (TCN) 410. This loss of connectivity can occur when assets travel through remote areas, such as desert highways, mountainous regions, or other locations where cellular infrastructure is sparse or unavailable. When the IoT device 300, such as an asset tracker or telematics device, is outside the coverage area of the TCN 410, the IoT device 300 is unable to communicate with the central server such as the asset tracking server 130 or the telematics server 230, resulting in service disruptions, data transmission gaps, and incomplete records of asset location and status. These interruptions can hinder real-time asset visibility, delay operational decision-making, and negatively impact regulatory compliance and fleet management efficiency. Such problems, however, can be overcome by employing direct-to-cell technology, which enables the IoT device to connect directly to satellite networks when terrestrial cellular coverage is lost. By leveraging direct-to-cell satellite connectivity as an auxiliary wireless network, continuous data transmission and reliable asset tracking can be maintained even in the most remote or challenging environments.

Figure 4:
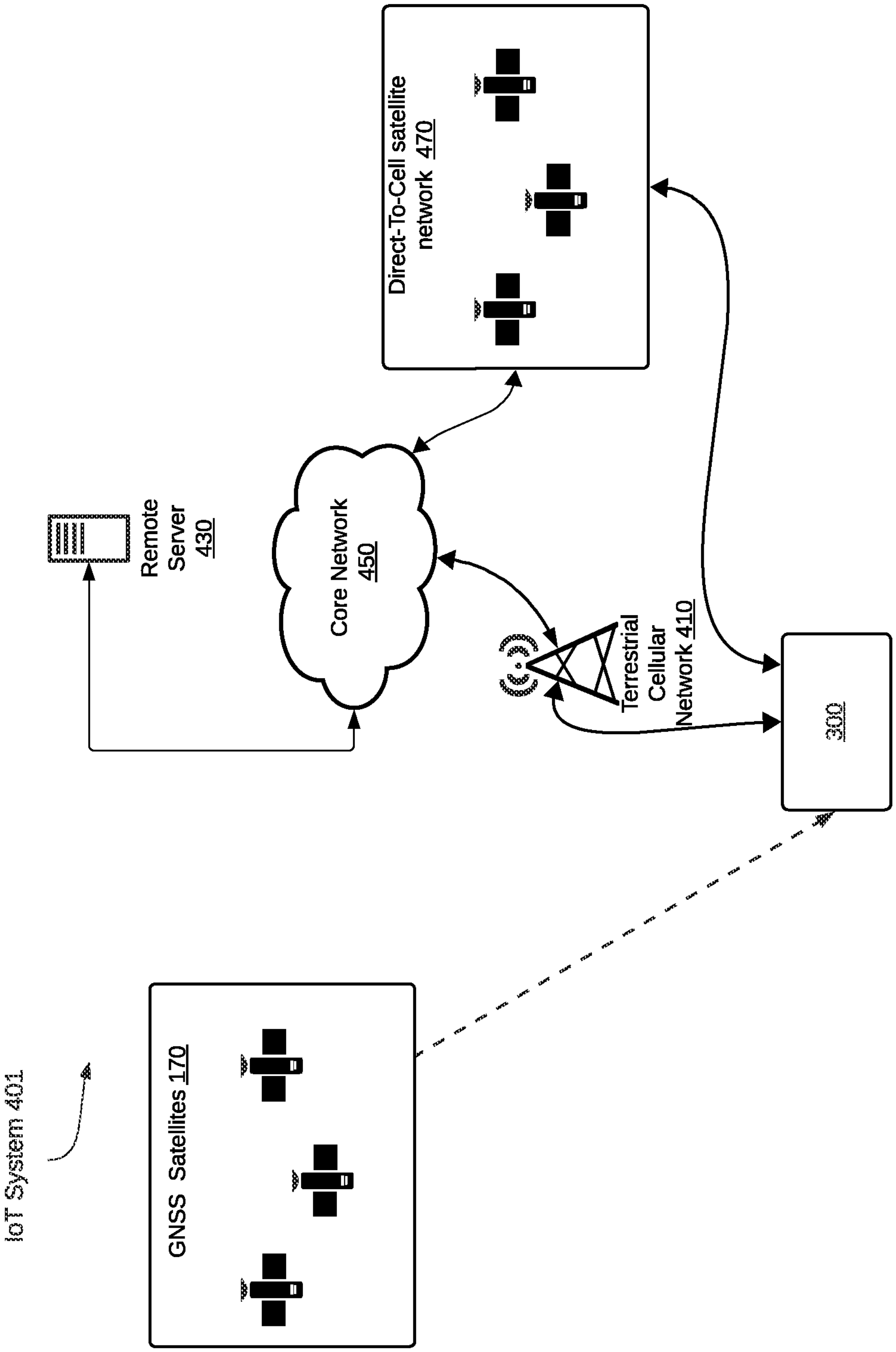
FIG. 4 is a system diagram illustrating the connectivity of the IoT device across GNSS, terrestrial cellular networks, direct-to-cell satellite networks, and a central network linked to a remote server.

FIG. 4 illustrates an IoT system 401 that incorporates both a main wireless network in the form of the terrestrial cellular network (TCN) 410 and an auxiliary wireless network in the form of the direct-to-cell (DTC) satellite network 470, each connected to a common core network 450. In this system, the asset tracker or IoT device 300 is equipped with a network interface 320 in the form of a cellular modem capable of establishing wireless communication with either the TCN 410 or the DTC satellite network 470. The DTC satellite network 470 comprises a constellation of Low Earth Orbit (LEO) satellites, which provide global coverage and enable direct communication with ground-based IoT devices.

During normal operation, the IoT device 300 connects to the TCN 410 via the network interface 320 to transmit asset data through the core network 450 to a remote server, such as an asset tracking server or telematics server. However, when the received signal drops below a predetermined signal strength on the TCN 410—such as when the asset moves into a remote area where terrestrial infrastructure is unavailable—the network interface 320 is capable of roaming directly to the LEO satellites of the DTC satellite network 470. This seamless transition allows the IoT device 300 to continue uploading buffered and real-time data to the remote server via the core network 450, ensuring uninterrupted asset visibility and reliable data delivery even in the most challenging or remote environments.

The IoT device operates in different modes depending on whether it is powered from a wired power source or from its internal battery, with each mode tailored to optimize performance, data reporting, and power consumption based on the available energy source.

When the IoT device is powered from a wired power source, such as an asset's battery or electrical system, it is able to operate in a high-activity mode. In this mode, the device can maintain frequent communication with the network, transmit data at shorter intervals, and support continuous or near-continuous operation of its network interface and sensors. For example, when connected to a terrestrial cellular network (TCN) or a direct-to-cell (DTC) satellite network while on wired power, the device can provide high-fidelity location updates, frequent status reports, and real-time transmission of operational data such as engine hours or odometer readings. The device may also be able to support over-the-air configuration changes and diagnostics due to the availability of ample power.

In contrast, when the IoT device 300 is operating on its battery 310, the IoT device 300 enters a power-saving mode to extend battery life. In this mode, the IoT device 300 reduces the frequency of data collection and transmission, and may rely on event-driven or scheduled reporting rather than continuous updates. For instance, the device may only wake periodically to collect and buffer location or sensor data, and transmit this data at longer, user-configurable intervals or when certain movement or status thresholds are met. The IoT device 300, while in battery mode, may also limit the use of power-intensive features, such as high-frequency GNSS updates or continuous network connectivity, and may disable non-essential functions such as firmware over-the-air (FOTA) updates while on battery power.

Additionally, the IoT device may implement specialized modes based on asset activity and user configuration. For example, in a movement mode, the IoT device 300 may increase the frequency of GNSS updates and data transmission when motion is detected, while in a stationary mode, it may reduce reporting frequency to conserve energy. The IoT device 300 may also support configurable modes such as immediate updates upon detecting movement, delayed updates, or time-based reporting, allowing users to tailor device behavior to specific operational requirements.

Overall, the IoT device intelligently adapts its operation based on the available power source, balancing the need for timely and accurate data reporting with the imperative to conserve energy and maximize device longevity in the field.

Figure 5:
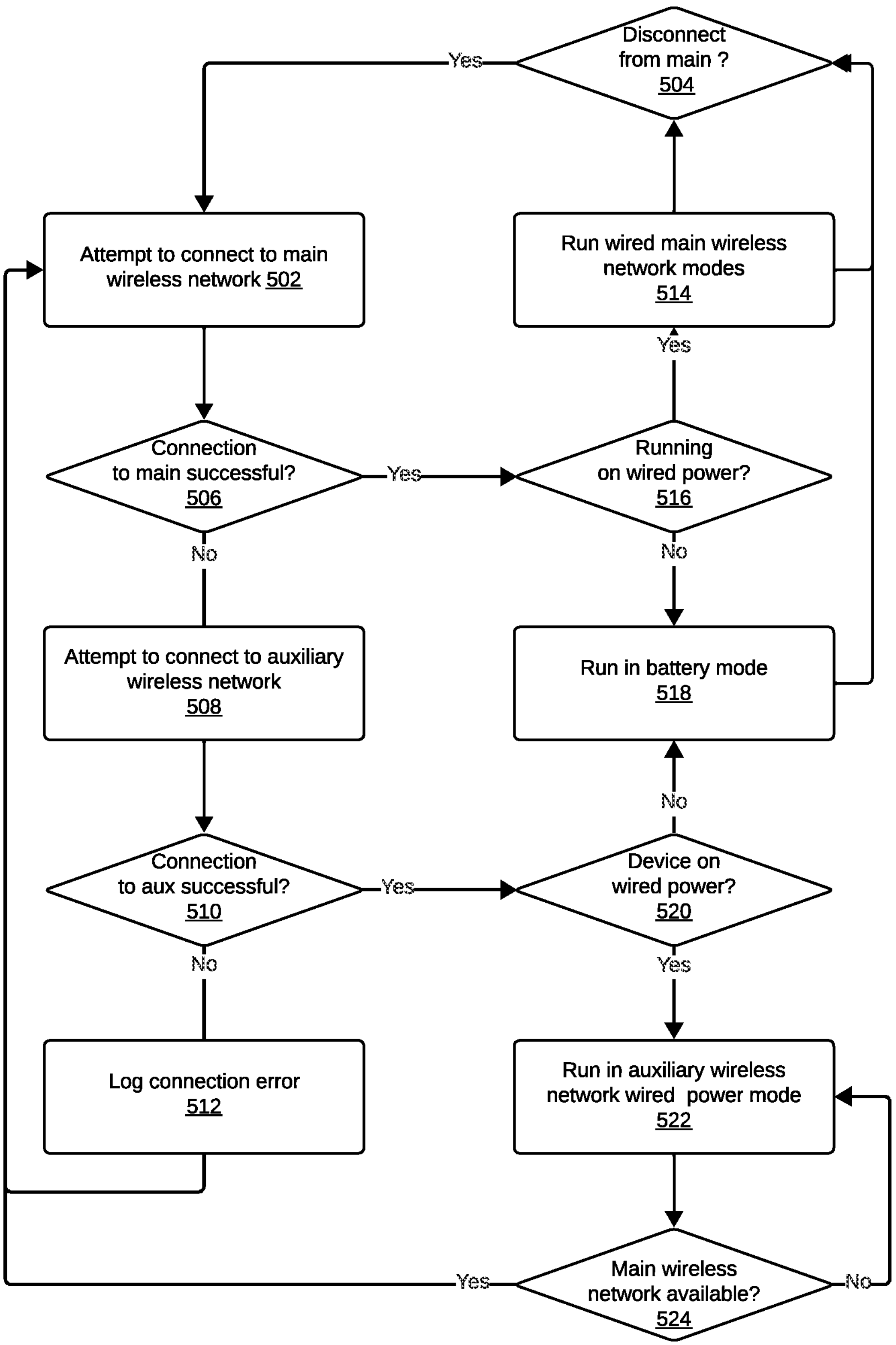
FIG. 5 is a block diagram depicting the decision-making process for transitioning between network connection modes in an IoT device.

FIG. 5 depicts a method by an IoT device 300, the method of managing communication between a main wireless network, such as a terrestrial cellular network (TCN 410) and an auxiliary wireless network such as a Direct-to-Cell (DTC) satellite network 470.

In operation, at step 502 the IoT device 300 attempts to establish a connection to a main wireless network such as the terrestrial cellular network (TCN) 410. Accordingly, the network interface 320 of the IoT device 300, which may comprise a wireless modem, initiates a scan for available terrestrial cellular networks 410. The TCN 410 may include, for example, 2G (GSM, GPRS, EDGE), 3G (UMTS, HSPA), 4G (LTE), 5G, or NB-IoT. The successful completion of this step is necessary for ensuring that the IoT device 300 can utilize the main wireless network for high-speed, low-latency data transmission. If the connection to the main wireless network is successful, the process proceeds to step 506. Alternatively, if the connection fails, the process transitions to step 508, wherein the IoT device 300 attempts to connect to an auxiliary wireless network.

At step 504, the IoT device 300 determines whether the device has been disconnected from the main wireless network, such as the terrestrial cellular network (TCN) 410. This disconnection may occur, for example, when the IoT device 300 moves beyond the coverage area of the TCN 410—such as entering a remote area, a tunnel, or an underground location. If the disconnection is detected, the process transitions to step 514 to determine the appropriate operational mode based on power source availability and network conditions. If, however, the IoT device 300 remains connected to the TCN 410, the device continues its standard operation without transitioning to an auxiliary wireless network.

In step 506 the Internet of Things (IoT) device 300 checks whether the network interface 320 has successfully established a connection to the main wireless network, such as the terrestrial cellular network (TCN) 410 attempted during step 502. If the connection is confirmed, the IoT device 300 executes step 516. Conversely, if the connection to the main wireless network is unsuccessful, the process transitions to step 508 for connection attempts to an auxiliary wireless network, such as a direct-to-cell (DTC) satellite network 470.

At step 516, the IoT device 300 determines whether the power source is wired. If the IoT device 300 is running on wired power, the process transitions to step 514 to operate in wired main wireless network modes. If, however, the IoT device 300 is not running on wired power, the process transitions to step 518 to operate in battery mode.

In step 514 the IoT device 300 is operating in wired cellular modes when the IoT device 300 is connected to a wired power source and has access to the main wireless network, such as the terrestrial cellular network (TCN) 410. In this mode, the IoT device 300 maintains frequent communication with the network 410, transmits data at shorter intervals, and supports continuous operation of its network interface 320 and the sensors 360. This configuration is designed to enhance data transmission performance and operational efficiency.

Step 518 represents the IoT device 300 operating in battery mode when the IoT device 300 is not connected to a wired power source. In this mode, the IoT device 300 reduces the frequency of data collection and transmission to conserve battery life. For example, the IoT device 300 may rely on event-driven or scheduled reporting and limit the use of power-intensive features, such as high-frequency GNSS updates or continuous network connectivity. Battery modes are used when the IoT device 300 is running off the battery 310 regardless of the wireless network that the IoT device 300 is connected to.

As discussed above, when the IoT device 300 fails to connect to the main wireless network fails at step 506, then control goes to step 508. At step 508 the IoT device 300 attempts to establish a connection to an auxiliary wireless network, such as a direct-to-cell (DTC) satellite network 470. The DTC satellite network 470 comprises a constellation of Low Earth Orbit (LEO) satellites providing global coverage and enabling direct communication with ground-based IoT devices 300. Connecting to the auxiliary wireless network facilitates continuous data transmission in remote or inaccessible areas where the main wireless network, such as the terrestrial cellular coverage 410 is unavailable.

At step 510, the IoT device 300 evaluates whether the connection to the auxiliary wireless network, such as the direct-to-cell (DTC) satellite network 470 attempted in step 508 is successful. If successful, the IoT device 300 transitions to step 520 in which the IoT device 300 determines whether it is running on wired power or battery power. If the connection is unsuccessful, the process transitions to step 512.

Step 512 involves the IoT device 300 logging a connection error when the device fails to establish connections to both the terrestrial cellular network (TCN) 410 and the direct-to-cell (DTC) satellite network 470. The logged error serves as a diagnostic tool for identifying connectivity issues and supports system troubleshooting. Additionally, the IoT device 300 may generate a status indicator 385 to notify a remote server 430 or administration terminal 240 of the connectivity failure. Subsequent to logging the error condition, the IoT device 300 may go back to step 502 to re-attempt connection with the main wireless network. The IoT device 300 may execute a delay or wait for motion detection before transitioning to step 502.

If the connection to the auxiliary wireless network is determined to be successful in step 510, the IoT device 300 executes step 520. At step 520, the IoT device 300 determines whether the device is connected to a wired power source while operating in auxiliary wireless network modes. If the device is on wired power, the process transitions to step 522 to operate in auxiliary wireless network wired power mode. Conversely, if the device is not on wired power, the process transitions to step 518 to operate in battery mode discussed above.

In operation, step 522 represents the IoT device 300 functioning in auxiliary wireless network wired power mode. This is the case when, for example, the IoT device 300 is connected to the direct-to-cell (DTC) satellite network 470 and is running off a wired power source. In this mode, the IoT device 300 adjusts its data transmission behavior to align with the bandwidth constraints of the auxiliary wireless network, such as the DTC satellite network 470. While running in step 522, the IoT device 300 periodically checks whether the main wireless network has become available by executing step 524.

At step 524, the IoT device 300 determines whether the main wireless network, such as the terrestrial cellular network (TCN) 410 becomes available while the IoT device 300 operates in auxiliary wireless network wired power modes. When the TCN 410 becomes available, the IoT device 300 transitions back to the main wireless network, such as the TCN 410 for data transmission, thereby promoting improved connectivity and cost efficiency. If the main wireless network, such as the TCN 410 remains unavailable, the IoT device 300 continues operating in auxiliary wireless network wired power mode.

Figure 6:
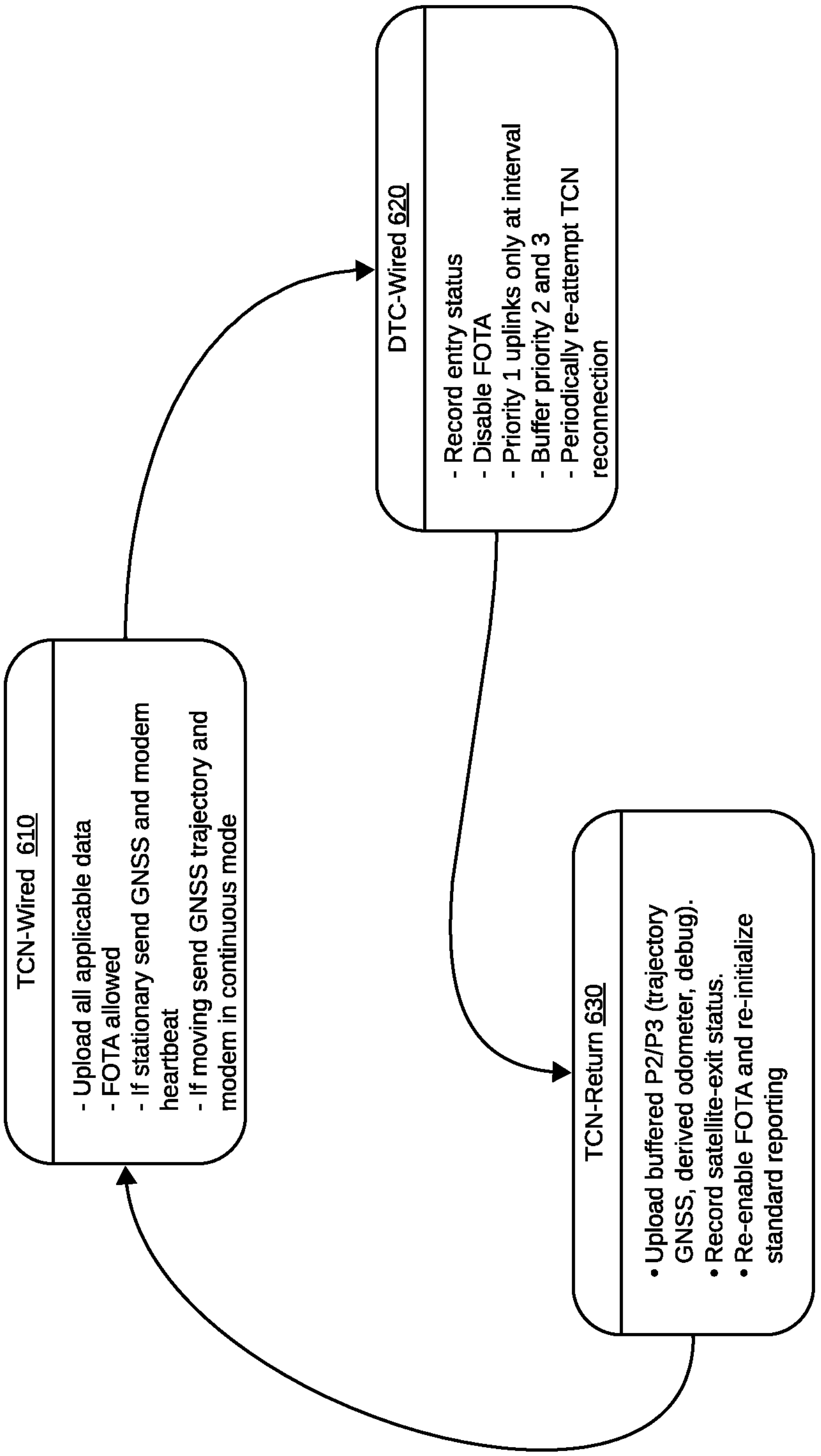
FIG. 6 is a block diagram illustrating single-stage DTC behavior for wired installations, showing transitions between terrestrial operation and satellite operation.

In one embodiment, the IoT device operates in a mode where, upon connecting with the auxiliary wireless network, such as the Direct-to-Cell (DTC) satellite network, the device uploads all buffered data, records a status indicating auxiliary wireless network operation (e.g., satellite operation), and prevents firmware-over-the-air (FOTA) updates. While connected to the auxiliary wireless network (e.g., the DTC satellite network), the device uploads priority-1 data, such as instantaneous location indicators, ignition state, external line-in voltage, temperature, or device health, at a configurable interval. Simultaneously, the device buffers trajectory Global Navigation Satellite System (GNSS) data for later upload upon reconnection to the main wireless network, such as the terrestrial cellular network (TCN). This embodiment ensures efficient data management and compliance with satellite data restrictions, while maintaining operational insights of significant importance. This embodiment is described with reference to FIG. 6. In FIG. 6 the TCN represents the main wireless network and the DTC represents the auxiliary wireless network.

FIG. 6 shows a block diagram illustrating the operational modes and transitions of an Internet of Things (IoT) device 300 as it moves between a terrestrial cellular network (TCN) and a direct-to-cell satellite network (DTC) in a wired installation. The IoT device 300 is connected to a terrestrial cellular network 410 and a DTC satellite network 470, with both networks linked to a remote server 430 via a core network 450. The IoT device 300 is powered by a wired power source, such as the external battery 372, enabling uninterrupted operation and frequent data transmission.

The IoT device 300 initially operates in TCN mode, utilizing the terrestrial cellular network 410 for data uploads and standard reporting. Upon loss of connectivity to the terrestrial cellular network 410, the IoT device 300 transitions to DTC mode, connecting to the DTC satellite network 470. In DTC mode, the device prioritizes the transmission of significant data to the remote server 430 while buffering less significant data for later upload. The device periodically attempts to reconnect to the terrestrial cellular network 410, and upon successful reconnection, resumes standard reporting and uploads all buffered data to the remote server 430.

The block diagram in FIG. 6 highlights the connections between the IoT device 300, the terrestrial cellular network 410, the DTC satellite network 470, and the remote server 430, illustrating the seamless transition and adaptive communication behavior of the device across different network environments.

State 610 (TCN-Wired) begins when the device attaches to the terrestrial cellular network while wired power is available. On initial entry, the controller confirms network registration, restores standard operating policies, and enables firmware-over-the-air (FOTA) updates because terrestrial bandwidth and cost are not constrained. During this state the IoT device 300 uploads all applicable data according to its wired policies: if the asset is stationary, the IoT device 300 provides GNSS heartbeat updates and a modem heartbeat; if the asset is moving, the device provides curve GNSS trajectory and runs the network interface (e.g., cellular modem) in continuous mode so that full-fidelity path and insights are delivered in near real time to the remote server 430. Debug and diagnostics are also eligible for upload. This behavior is chosen because terrestrial cellular service does not impose the tight data budget that exists on DTC networks and the wired power source (e.g., external battery 372) permits higher reporting frequency without compromising device energy reserves, thereby maximizing asset visibility and enabling timely configuration changes and FOTA when needed.

The DTC-Wired State 620 is entered when the IoT device 300 detects that the received signal drops below a predetermined signal strength on the terrestrial network and successfully roams to the direct-to-cell satellite network while wired power remains available. On entry, the IoT device 300 records a satellite-in-use status for server and UI indication and immediately prevents FOTA to avoid consuming satellite bandwidth on non-essential traffic. The IoT device 300 then transitions to single-stage satellite behavior in which uplinks consist only of priority-1 data at a configured interval. Priority-1 data include instantaneous location indicators and at least one critical indicator like ignition state, external line-in-voltage, temperature, or device health. Throughout the DTC-Wired state 620 the IoT device 300 buffers priority-2 trajectory GNSS and priority-3 debug data in non-volatile memory for later upload upon return to TCN connectivity. The IoT device 300 may maintain registration to the DTC network and transmit only on schedule or, in alternative implementations, disconnect and reconnect at each interval to reduce overhead between uplinks. This behavior is chosen to adhere to carrier-defined satellite data limits on the DTC network, while preserving the most valuable operational insights and situational awareness for the user interface, leveraging wired power to sustain operation without incurring excessive satellite data charges.

State 630 (TCN-Return) is entered when the IoT device 300 determines that TCN coverage is again available and successfully re-attaches to the TCN 410. On entry, the IoT device 300 records a satellite-exit status for server-side indication, re-enables FOTA, and re-initializes standard reporting policies. During this state the lot device 300 uploads buffered data accumulated during satellite operation, including priority-2 trajectory GNSS and, if enabled by policy, priority-3 debug and diagnostics, so that the remote server 430 can reconstruct the path visualization and close any visibility gaps created while operating under DTC satellite data restrictions. This behavior is chosen to restore full-fidelity records, synchronize the device with the server, and resume the continuous or heartbeat reporting modes appropriate to wired terrestrial operation, thereby ensuring continuity of historical logs and resumption of real-time insights without satellite constraints.

Figure 7:
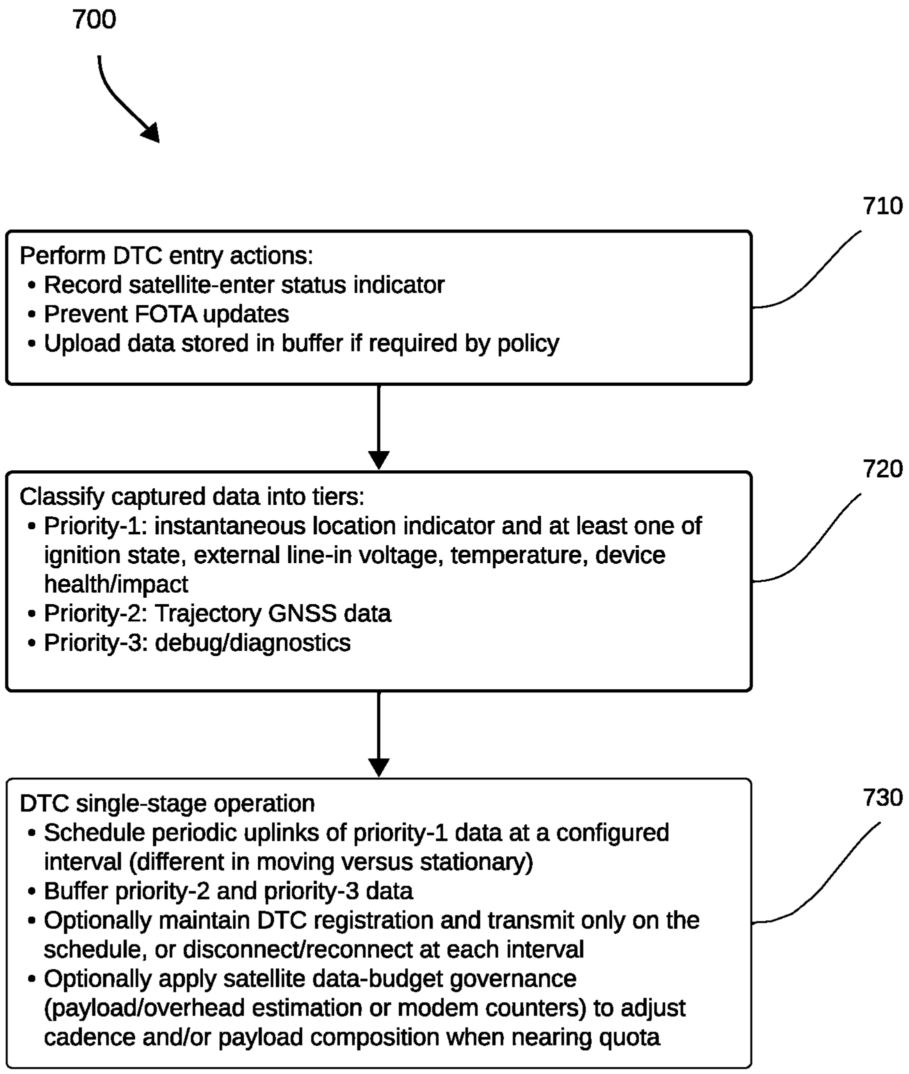
FIG. 7 is a block diagram depicting a method executed by the IoT device while in single-stage DTC for wired installations.

FIG. 7 shows a flowchart illustrating the method 700 executed by an IoT device 300 during Direct-to-Cell (DTC) operation in a single-stage configuration. The flowchart begins with the IoT device 300, which is connected to a remote server 430 and an administration terminal 240 via a DTC satellite 470. The device 300 is equipped with a memory 340 for buffering data, and an indicator signal interface 385 for status reporting. These components interact to facilitate data transmission and operational state transitions as the device moves between terrestrial cellular network 410 and DTC satellite network 470 environments.

At step 710, upon entering DTC mode, the IoT device 300 performs entry actions. The IoT device 300 records a satellite-entry status indicator 385, signaling the transition to DTC mode and enabling the remote server 430 and administration terminal 240 to reflect the satellite network status. Firmware Over-The-Air (FOTA) updates are prevented to conserve satellite bandwidth, ensuring that only prioritized data is transmitted. Buffered data accumulated during terrestrial cellular network 410 outages is uploaded to the remote server 430, thereby maintaining continuity of asset reporting.

Figure 8:
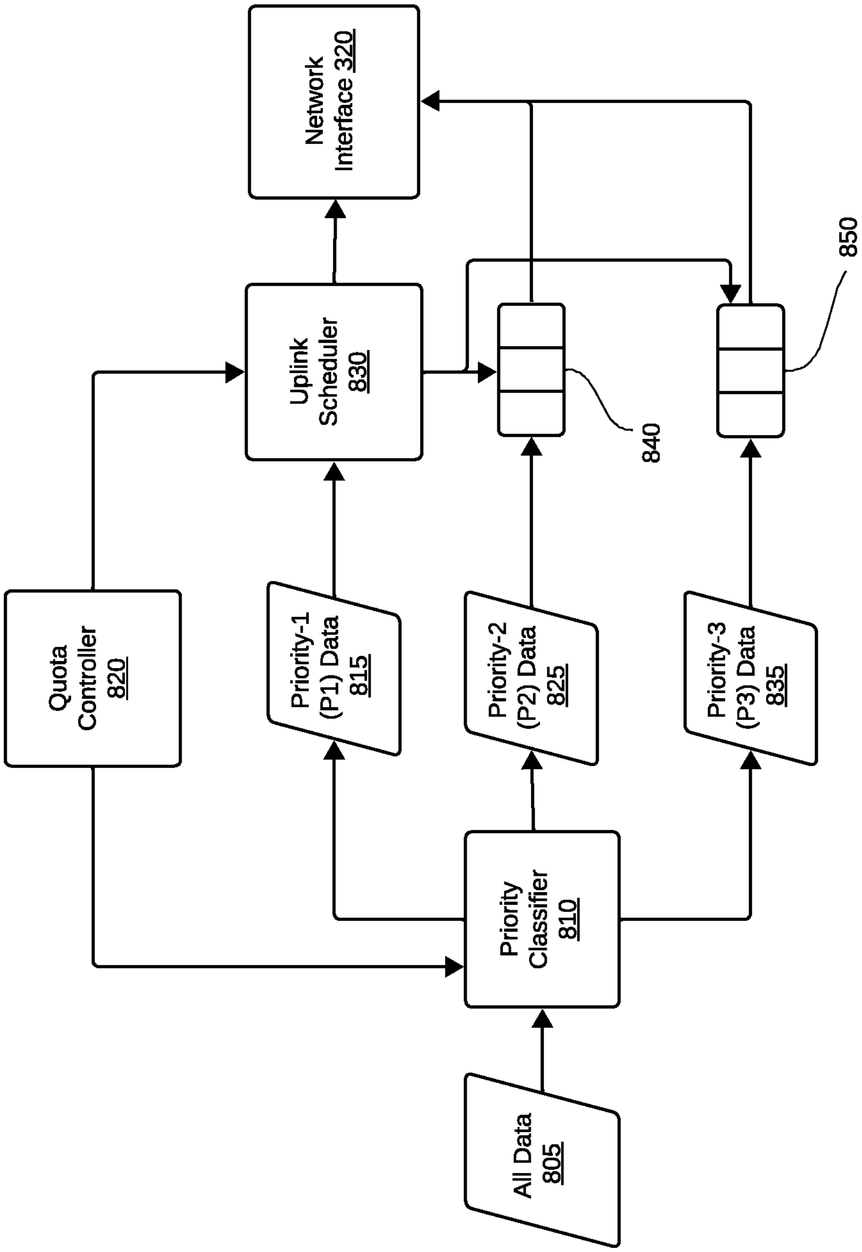
FIG. 8 is a block diagram illustrating data prioritization and uplink control during single-stage DTC operation.

At step 720, the IoT device 300 classies captured data into priority tiers, as depicted by the visual elements in the FIG. 8. The IoT device 300 uses a priority classifier 810 to organize data into Priority-1 (P1) data 815, Priority-2 (P2) data 825, and Priority-3 (P3) data 835. Priority-1 data 815 includes instantaneous location indicators and at least one operational parameter of significant importance, such as ignition state, external line-in voltage, temperature, or device health. Priority-2 data 825 consists of trajectory GNSS logs, which are buffered for later transmission. Priority-3 data 835 comprises debug and diagnostic information, stored for deferred upload. This tiered approach ensures that the most important data is prioritized for transmission under satellite bandwidth constraints.

At step 730, the IoT device 300 operates in DTC single-stage operation. During DTC single-stage operation 730, the IoT device 300 periodically uploads Priority-1 data 815 at configurable intervals, as indicated by the corresponding bullet points in the flowchart. The reporting interval may be adjusted based on whether the asset 100 is stationary or in motion, optimizing data delivery for operational relevance. Priority-2 data 825 and Priority-3 data 835 remain buffered in memory 340, awaiting reconnection to terrestrial cellular networks 410 for upload. The IoT device 300 may maintain continuous registration with the satellite network 470, transmitting only at scheduled intervals, or may disconnect and reconnect at each interval to minimize overhead. Satellite data-budget governance mechanisms are optionally applied, allowing the device to estimate payload size and overhead, and to adjust uplink cadence or payload composition as the carrier-defined data quota is approached.

FIG. 8 shows a block diagram of the data prioritization and uplink control system 800 for an IoT device 300 during Direct-to-Cell (DTC) operation. The system takes as input All Data 805, which is directed to a Priority Classifier 810. The Priority Classifier 810 produces three outputs: Priority-1 Data 815, Priority-2 Data 825, and Priority-3 Data 835. The Priority-1 Data 815 is routed to the Uplink Scheduler 830, which is also connected to a Quota Controller 820. The Uplink Scheduler 830 interfaces with the Network Interface 320 for communication with the DTC satellite network 470. Priority-2 Data 825 and Priority-3 Data 835 are directed to Buffers 840 and 850, respectively, for deferred transmission.

In the initial state, All Data 805 generated by the IoT device 300 is classified by the Priority Classifier 810. The Priority Classifier 810 sorts the data into three priority tiers based on operational significance. Priority-1 Data 815 includes metrics such as instantaneous location indicators and ignition status, which are necessary for maintaining real-time asset visibility and operational awareness. Priority-2 Data 825 consists of trajectory GNSS logs, and Priority-3 Data 835 comprises debug and diagnostic information.

During ongoing DTC operation, the Uplink Scheduler 830 manages the transmission of Priority-1 Data 815 at configurable intervals. The Quota Controller 820 monitors satellite data usage and dynamically adjusts the transmission cadence and payload composition to comply with carrier-defined bandwidth limits. If the quota threshold is approached, the Quota Controller 820 restricts the transmission of lower-priority data to prevent exceeding the allowed data budget.

Priority-2 Data 825 and Priority-3 Data 835 are buffered in buffers 840 and 850, respectively, for deferred upload. The buffers 840 and 850 ensure that data of lower importance is preserved and transmitted when the IoT device 300 reconnects to terrestrial cellular network 410. The network interface 320 facilitates communication with the DTC satellite network 470, transmitting prioritized data packets and maintaining network registration or reconnecting at each interval to optimize resource usage.

The data prioritization and uplink control system 800 prioritizes the transmission of operational data of high importance while buffering less significant information, thereby optimizing satellite bandwidth usage and ensuring compliance with data restrictions. The described approach supports uninterrupted asset visibility and operational performance, even in remote or resource-constrained environments.

In an alternate embodiment, the IoT device 300 modifies the operational behavior during the initial extended duration (e.g., 24 hours) after roaming to the DTC satellite network. During this timeframe, the IoT device 300 uploads both priority-1 data and trajectory GNSS data at a first interval, such as once per hour, while alternating between connecting to the DTC satellite network 470 to upload data and disconnecting to reduce overhead. After the expiration of the initial extended duration, the device transitions to uploading only priority-1 data at the same interval, while buffering trajectory GNSS data for later upload upon reconnection to the TCN. This embodiment is particularly suited for scenarios where the device is anticipated to remain in DTC mode for prolonged durations, optimizing data usage while preserving detailed trajectory information for subsequent reporting. This embodiment is described with reference to FIG. 9.

Figure 9:
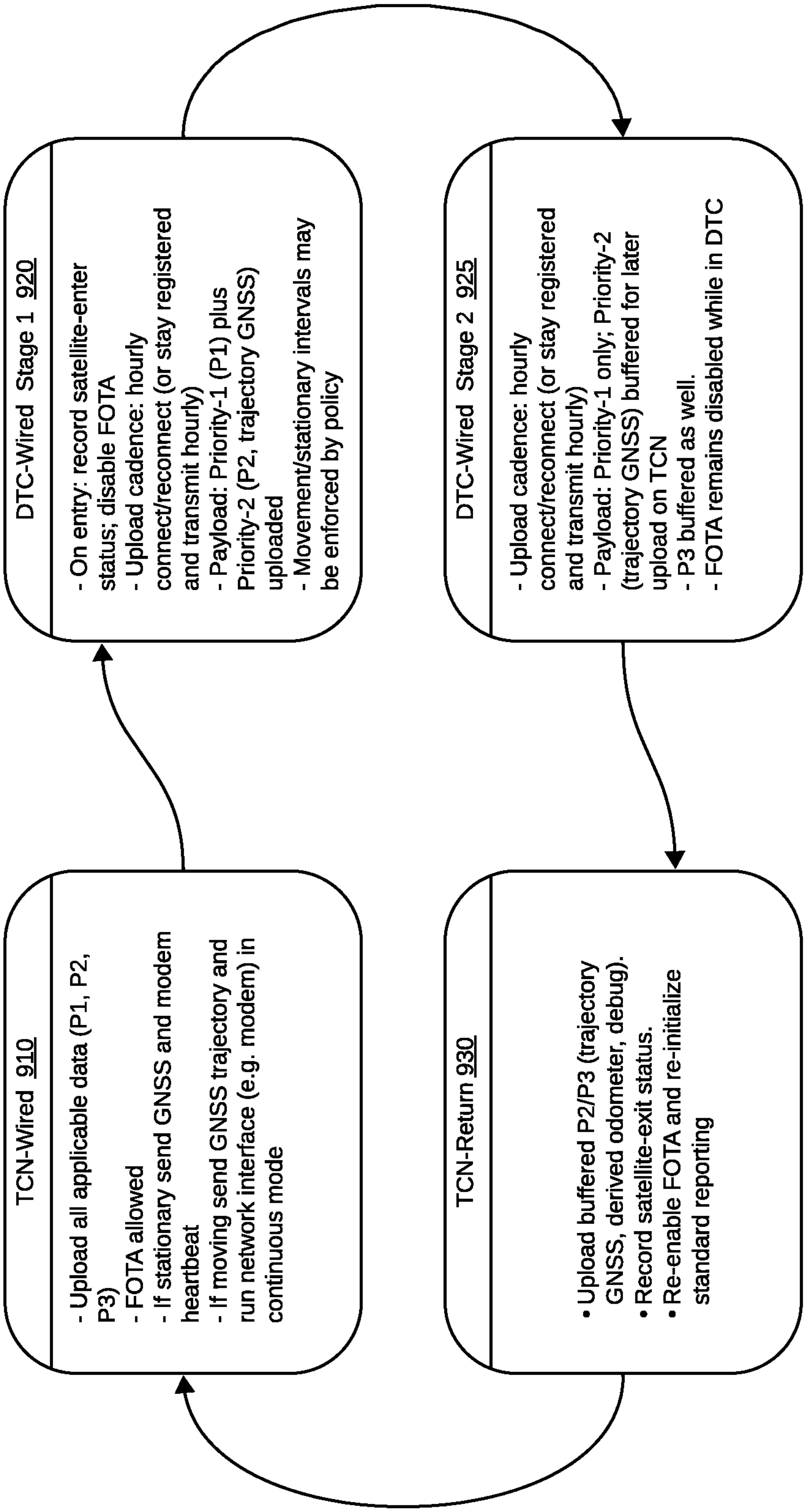
FIG. 9 is a block diagram illustrating a two-stage DTC alternative for wired installations.

FIG. 9 presents a state chart that illustrates the operational states and transitions of an IoT device 300 as the device alternates between a terrestrial cellular network 410 and a DTC satellite network 470, while being powered by a wired energy source. The IoT device 300 maintains connectivity with both the terrestrial cellular network 410 and the DTC satellite network 470, with each network being linked to a remote server 430 through a core network 450. The flowchart visually depicts the connections and transitions involving these networks and the IoT device 300, highlighting the adaptive communication strategy utilized in varying network environments.

In the TCN-Wired 910 state, the IoT device 300 operates under terrestrial cellular network coverage 410 and is powered by a wired energy source. During this state, the IoT device 300 uploads all data 805, including Priority-1 815, Priority-2 825, and Priority-3 835 data, as indicated by the corresponding visual elements and bullet points in the figure. Firmware Over-The-Air (FOTA) updates are enabled. The device transmits GNSS heartbeat updates and modem heartbeat signals when stationary, or detailed GNSS trajectory data in continuous mode when moving. This behavior leverages the ample bandwidth and power available in terrestrial operation to maximize asset visibility and support real-time data delivery.

When the received signal drops below a predetermined signal strength on the TCN 410, the device transitions to DTC-Wired Stage 1 920, roaming to the DTC satellite network 470. In this stage, the IoT device 300 records a satellite-enter status and prevents FOTA updates to conserve satellite bandwidth. The device uploads data on an hourly cadence, either by maintaining continuous registration with the DTC satellite network 470 or by disconnecting and reconnecting at each interval, as depicted by the flowchart's bullet points. The payload transmitted includes Priority-1 data and Priority-2 trajectory GNSS data, with intervals adjusted based on asset movement or stationary status to optimize transmission and comply with carrier-defined data limits.

If the IoT device 300 remains in DTC mode for an extended duration, it transitions to DTC-Wired Stage 2 925. In this state, stricter data management is enforced, and the device continues to upload data hourly, using either continuous registration or periodic reconnection. Only Priority-1 data is transmitted, while Priority-2 trajectory GNSS data and Priority-3 debug data are buffered for later upload. FOTA updates remain disabled, and the flowchart's visual elements highlight the prioritization and buffering strategy designed to adhere to satellite bandwidth constraints while maintaining operational insights critical to functionality.

When the IoT device 300 reconnects to the terrestrial cellular network 410, the IoT device transitions into the TCN-Return 930 state. In this state, the IoT device uploads all buffered Priority-2 and Priority-3 data, including trajectory GNSS logs and debug information, as indicated by the flowchart's bullet points. The IoT device records a satellite-exit status, re-enables FOTA updates, and re-initializes standard reporting policies, resuming continuous or heartbeat reporting modes appropriate to wired terrestrial operation. This process ensures that all data collected during DTC operation is transmitted to the server, restoring full-fidelity records and real-time insights.

The state chart in FIG. 9 thus demonstrates the seamless transition and adaptive communication behavior of the IoT device 300 across terrestrial and satellite network modes, with visual elements and bullet points emphasizing efficient data prioritization, bandwidth management, and operational adaptability to support uninterrupted asset visibility and reliable data transmission.

Figure 10:
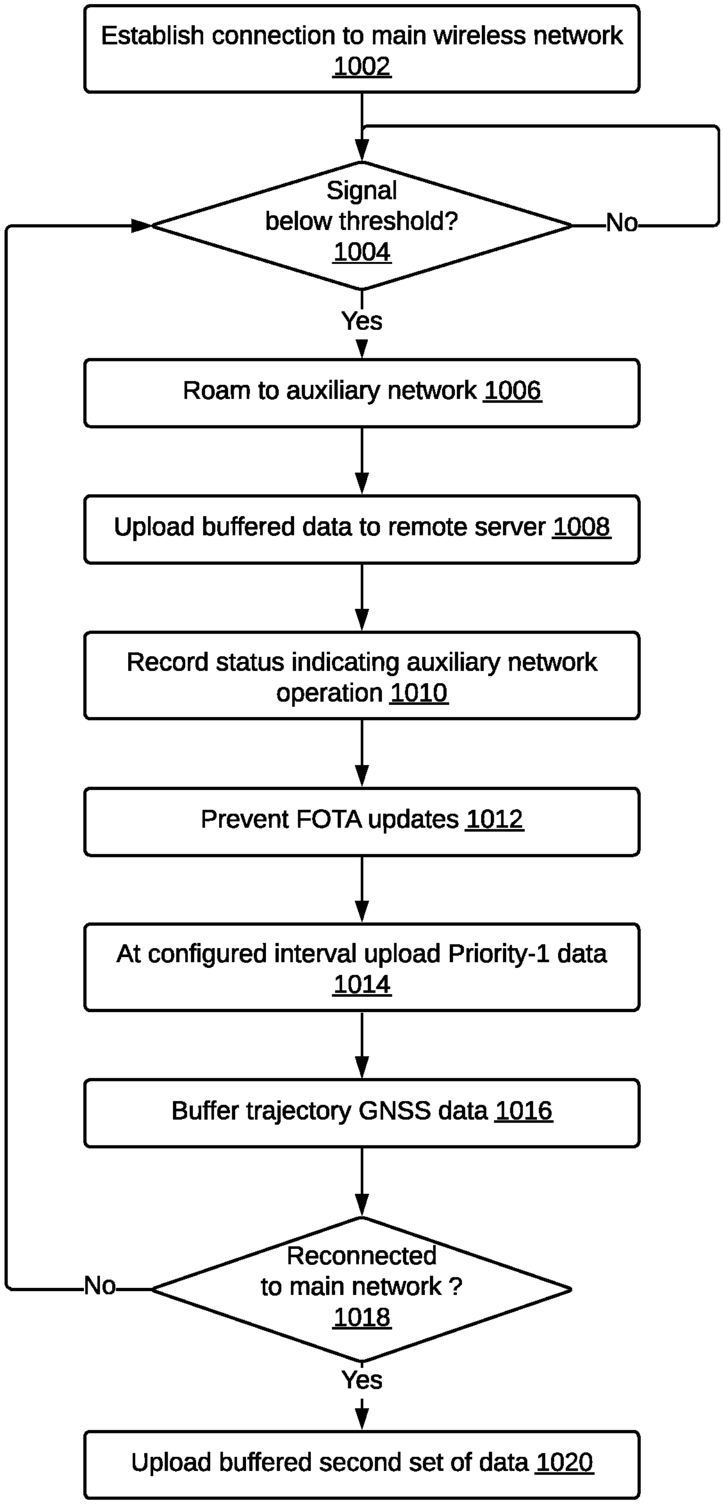
FIG. 10 is a flowchart for a generalized method by an electronic device as it roams from a main network to an auxiliary network.

FIG. 10 illustrates an example of a method for managing communication by an Internet-of-Things (IoT) device powered by a wired source, in which the illustrated operations include establishing connection to main wireless network 1002, signal below threshold 1004, roam to auxiliary network 1006, upload buffered data to remote server 1008, record status indicating auxiliary network operation 1010, prevent FOTA updates 1012, at configured interval upload priority-1 data (location indicator) 1014, buffer trajectory GNSS data 1016, reconnected to main network 1018, and upload buffered second set of data 1020. In the language of claim 1, the operations shown in FIG. 10 are examples of establishing, via a network interface, a connection to a main wireless network, detecting loss of the connection to the main wireless network, connecting to an auxiliary wireless network, uploading data stored in a buffer to a remote server, recording a status indicating operation on the auxiliary wireless network, preventing firmware-over-the-air updates, uploading a first set of data comprising priority-1 data including at least an instantaneous location indicator, buffering a second set of data comprising trajectory Global Navigation Satellite System data, and, upon reconnection to the main wireless network, uploading the buffered second set of data and re-initializing standard reporting. This improves consistency between the claim language and the illustrated embodiment while preserving flexibility for other implementations.

FIG. 10 depicts an example sequence including establishing connection to a main wireless network 1002, determining whether a signal is below a threshold 1004, roaming to an auxiliary network 1006, uploading buffered data to a remote server 1008, recording a status indicating auxiliary network operation 1010, preventing firmware-over-the-air updates 1012, at a configured interval uploading priority-1 data including a location indicator 1014, buffering trajectory Global Navigation Satellite System data 1016, determining whether the system is reconnected to the main network 1018, and uploading a buffered second set of data 1020, in which the illustrated operations are examples of operations performed by an Internet-of-Things device 300 powered by a wired source via a power module 370, under control of a controller 330, using a network interface 320, a memory 340, a location module 350, and indicator signals 385, and communicating with a terrestrial cellular network 410, a direct-to-cell satellite network 470, a core network 450, and a remote server 430, with positioning supported by Global Navigation Satellite System satellites 170 and payload selection supported by a priority classifier 810 and an uplink scheduler 830 with quota control 820.

Establishing a connection to a main wireless network 1002 can be performed by a controller of the network interface 320 executing firmware instructions to attach to the terrestrial cellular network 410 and establish a data session through the core network 450 toward the remote server 430. Implementations of the network interface 320 include a 3GPP modem for the network interface 320 controlled by firmware on the controller 330, and commercially available modem/module examples include offerings from Quectel, Telit Cinterion, u-blox, Nordic Semiconductor, and Qualcomm.

Determining whether a signal is below a threshold 1004 can be performed as decision logic in the network interface 320 that evaluates whether connectivity to the terrestrial cellular network 410 has degraded to a level consistent with loss of the connection, with the threshold comparison in FIG. 10 being one example of such detection. This improves robustness by enabling controlled transitions rather than waiting for complete communication failure.

Roaming to an auxiliary network 1006 can be performed by the firmware of the network interface 320 which is configured to attach to the direct-to-cell satellite network 470 as an auxiliary wireless network when the signal strength of the connection to the TCN 410 drops below the threshold in step 1004. This improves continuity of communications when terrestrial coverage is unavailable.

Uploading buffered data to a remote server 1008 can be performed as an entry action upon operation on the auxiliary wireless network, in which the controller 330 reads buffered records from the memory 340 and transmits those records using the network interface 320 through the direct-to-cell satellite network 470 and the core network 450 to the remote server 430. Inputs can include queued records, message identifiers, transport configuration, and credentials, and outputs can include transmitted payloads, acknowledgments, updated queue pointers, and retry state stored in the memory 340. Implementations include MQTT, HTTPS, or other telemetry transports with local queue management in flash-backed storage of the memory 340, and commercially available ingestion endpoints include common IoT backends such as AWS IoT Core and Microsoft Azure IoT Hub, as well as private MQTT/HTTP(S) servers corresponding to the remote server 430. This secures delivery of previously collected information once a fallback uplink becomes available.

Recording a status indicating auxiliary network operation 1010 can be performed by storing a mode indicator in the memory 340 and/or emitting indicator signals 385 that are reported to the remote server 430 so that downstream systems can differentiate auxiliary-network traffic from main-network traffic. Inputs can include successful attachment events for the direct-to-cell satellite network 470, reported by the network interface 320 to the controller 330. Implementations include a state machine executed by the controller 330 with state persisted in the memory 340 and reported via the network interface 320. This improves observability by making auxiliary-network operation explicit for logging, monitoring, and user interfaces.

Preventing firmware-over-the-air updates 1012 can be performed by the controller 330 gating an update agent so that update checks, downloads, and installations are inhibited while the Internet-of-Things device 300 operates on the direct-to-cell satellite network 470. Inputs can include the recorded auxiliary-network state from 1010, pending update campaign metadata, bandwidth budget parameters, and operational policy stored in the memory 340, and outputs can include suspended update workflows, deferred update tasks, and preservation of update state for later resumption. Implementations include commercially available embedded update frameworks and device-management clients, including Mender, Balena, and cloud-integrated update services associated with AWS and Azure device-management offerings. This preserves constrained auxiliary-network capacity for operational telemetry rather than At a configured interval, uploading priority-1 data including a location indicator 1014 can be performed by the controller 330 scheduling transmissions via the uplink scheduler 830, selecting a subset of available telemetry using the priority classifier 810 as priority-1 data 815, and generating a payload that includes an instantaneous location indicator derived from the location module 350, while transmitting over the network interface 320 through the direct-to-cell satellite network 470. Inputs can include timing parameters stored in the memory 340, a current location fix from the location module 350, selected operational signals such as power-related information from the power module 370 and indicator signals 385, and policy constraints from the quota controller 820, and outputs can include a transmitted priority-1 report, acknowledgement state, and updated scheduling state. Implementations include a timer-driven task in firmware running on the controller 330, with data serialization and compression tuned for low-bandwidth transmission, and commercially available positioning and connectivity subsystems can be provided by GNSS and cellular module vendors such as u-blox and Quectel integrated with embedded schedulers. This ensures that high-importance telemetry continues to reach the remote server 430 during constrained connectivity.

Buffering trajectory Global Navigation Satellite System data 1016 can be performed by the controller 330 collecting trajectory points from the location module 350 and persisting those points in the memory 340 as a deferred-upload dataset while the Internet-of-Things device 300 remains on the direct-to-cell satellite network 470. Inputs can include timestamped position fixes, speed and heading information, fix quality metrics, and trajectory collection rules, and outputs can include a buffered trajectory dataset, updated indices for the buffer, and retention metadata. Implementations include ring buffers, flash-backed logs, database tables, and optional path simplification routines executed by the controller 330 prior to persistence in the memory 340, and commercially available GNSS receivers used as or within the location module 350 are available from u-blox, Quectel, and Broadcom-based ecosystems. This improves bandwidth efficiency by deferring larger path datasets while retaining the ability to reconstruct travel history.

Determining whether the system is reconnected to the main network 1018 can be performed by the controller 330 monitoring radio and session state from the network interface 320 and evaluating whether attachment to the terrestrial cellular network 410 is restored according to stored policy in the memory 340. Inputs can include successful registration and session establishment on the terrestrial cellular network 410, improved radio measurements, and retry timers, and outputs can include a mode transition back toward main-network operation and triggers for deferred upload actions. Implementations include event-driven network state handlers that prioritize the terrestrial cellular network 410 when available while permitting continued auxiliary operation via the direct-to-cell satellite network 470 when not available. This improves stability by restoring preferred connectivity as soon as feasible.

Uploading a buffered second set of data 1020 can be performed by the controller 330 transmitting the deferred trajectory dataset stored in the memory 340 via the network interface 320 over the terrestrial cellular network 410 and the core network 450 to the remote server 430 after reconnection is detected. Inputs can include the reconnection event from 1018, buffered trajectory data assembled from operation 1016, batching and retry parameters, and standard reporting configuration stored in the memory 340, and outputs can include transmission of the buffered dataset, acknowledgments from the remote server 430, clearing or checkpointing of the trajectory buffer, and restoration of standard reporting state. Implementations include bulk publish routines over MQTT or HTTPS with congestion-aware pacing, and commercially available cloud ingestion and analytics backends can serve as the remote server 430 for such data synchronization. This restores full historical visibility while returning the communication pattern to a higher-throughput mode.

In operation, the Internet-of-Things device 300 powered by a wired source initiates connectivity through the network interface 320 and establishes a session on the terrestrial cellular network 410 as represented by 1002. When the received signal strength from the TCN 410 drops below a predetermined threshold, the network interface 320 roams to the direct-to-cell satellite network 470 as represented by 1006, uploads buffered data from the memory 340 to the remote server 430 as represented by 1008, records an auxiliary-mode status using the memory 340 and/or indicator signals 385 as represented by 1010, and inhibits firmware-over-the-air updates as represented by 1012. While operating via the auxiliary wireless network, the controller 330 periodically selects priority-1 data 815 using the priority classifier 810, schedules transmission using the uplink scheduler 830 under constraints enforced by the quota controller 820, and uploads priority-1 data including an instantaneous location indicator derived from the location module 350 as represented by 1014, while buffering trajectory Global Navigation Satellite System data in the memory 340 as represented by 1016. The network interface 320 continues evaluating whether connectivity to the terrestrial cellular network 410 is restored as represented by 1018, and upon restoration, the IoT device uploads the buffered second set of data to the remote server 430 as represented by 1020 and returns to standard reporting behavior. This provides controlled continuity of critical telemetry under constrained connectivity and complete reconciliation of deferred datasets when preferred connectivity returns.

In one aspect of the present disclosure, there is provided a method for managing communication by an Internet-of-Things (IoT) device powered by a wired source, comprising establishing, via a network interface 320 on an IoT device 300, a connection to a main wireless network (e.g., TCN 410), when the received signal drops below a predetermined signal strength on the main network, roaming to the auxiliary network, upon roaming to the auxiliary wireless network uploading data stored in a buffer in memory 340 to a remote server 430, recording a status indicating operation on the auxiliary wireless network, and preventing firmware-over-the-air (FOTA) updates, while connected to the auxiliary wireless network at a configured interval uploading a first set of data comprising priority-1 data including at least an instantaneous location indicator from a location module 350 and buffering a second set of data comprising trajectory Global Navigation Satellite System (GNSS) data in memory 340, and upon roaming back to the main wireless network uploading the buffered second set of data and re-initializing standard reporting as coordinated through a core network 450, all shown across FIGS. 3, 4, 6, and 7. This ensures uninterrupted situational awareness under constrained links and full data reconciliation on return.

In some implementations, the configured interval is selected based on movement state, including while movement is detected uploading the first set of data at a first interval and while stationary uploading the first set of data at a second interval, wherein each interval is remotely configurable; controller 330 schedules transmissions via network interface 320 using motion derived from GNSS receiver 350 as shown in FIGS. 6 and 7. This improves operational relevance and bandwidth efficiency.

In some implementations, the method for managing communication by an Internet-of-Things (IoT) device powered by a wired source further comprises periodically attempting to roam back to the main wireless network while connected to the auxiliary wireless network, with controller 330 executing reconnect scans through network interface 320 and reporting status to server 430 as depicted in FIG. 5, FIG. 6 and FIG. 9. This secures timely restoration to lower-cost connectivity.

In some implementations, buffering the trajectory GNSS data comprises simplifying the trajectory using a Ramer-Douglas-Peucker algorithm prior to storage in memory 340 based on positions from GNSS receiver 350, under control of controller 330. This reduces storage footprint and deferred upload size while preserving path fidelity.

In some implementations, recording a status indicating operation on the auxiliary wireless network comprises emitting a first status indicator via the network interface 320 upon roaming to the auxiliary wireless network and a second status indicator upon resuming the main wireless network, which are consumed by server 430 and surfaced at an administration terminal 240. This improves administrator awareness of network mode.

In some implementations, the method for managing communication by an Internet-of-Things (IoT) device powered by a wired source further comprises estimating data usage over the auxiliary wireless network based on payload size measured by controller 330 and a transport-overhead factor, and, upon reaching a threshold, reducing an upload cadence and/or restricting payload composition to remain within a configured budget, with a quota controller 820 acting on the Uplink Scheduler 830 and the priority classifier 810 in FIG. 8. This ensures compliance with carrier quotas in the auxiliary wireless network, such as the DTC 470.

In some implementations, the method for managing communication by an Internet-of-Things (IoT) device powered by a wired source further comprises enforcing a data budget over the auxiliary wireless network based on counters obtained from the network interface 320 or a network service accessible via the DTC 470 and the core network 450, under controller 330 governance as shown in FIG. 8. This secures predictable monthly usage.

In some implementations, while connected to the auxiliary wireless network the device maintains network registration via network interface 320 but transmits uplinks only at the configured interval under controller 330 scheduling, as indicated in FIG. 6 and FIG. 7. This reduces signaling overhead without sacrificing scheduled updates.

In some implementations, while connected to the auxiliary wireless network the IoT device 300 disconnects and reconnects at each configured interval through network interface 320 under controller 330 control, as shown in FIG. 6 and FIG. 7. This improves efficiency when periodic attachment reduces idle overhead.

In some implementations, the first set of data comprises priority-1 data that includes at least an instantaneous location indicator from GNSS receiver 350 and at least one of ignition state via indicator interface 385, external line-in voltage via power module 370, temperature via sensors 360, or device health computed by controller 330, as organized in FIG. 8. This ensures critical insights are delivered under constrained bandwidth.

In some implementations, the method for managing communication by an Internet-of-Things (IoT) device powered by a wired source further comprises applying per-device randomized staggering to scheduled transmissions over the auxiliary wireless network within a bounded tolerance, with controller 330 adjusting the network interface 320 timing and server 430 coordinating ingestion across core network 450 as shown in FIG. 8. This reduces gateway congestion and contention.

In some implementations, the method for managing communication by an Internet-of-Things (IoT) device powered by a wired source further comprises, when a high-frequency reporting mode is enabled, maintaining priority-1-only payloads while decreasing the configured interval subject to a monthly data budget over the auxiliary wireless network, controlled by controller 330 and the quota module in FIG. 8 and executed over 470. This improves responsiveness during theft or emergencies without overruns.

In some implementations, the IoT device 300 refrains from performing FOTA until after reconnection to the main wireless network and completion of uploading buffered data, with controller 330 gating updates while connected to the auxiliary wireless network, such as the DTC satellite 470 and re-enabling on the main wireless network, such as the TCN 410 as shown in FIG. 6 and FIG. 7. This secures bandwidth for operational telemetry on constrained links.

In some implementations, the IoT device 300 refrains from performing FOTA until after reconnection to the main wireless network and completion of uploading buffered data, with controller 330 gating updates while connected to the auxiliary wireless network, such as the DTC satellite 470 and re-enabling on the main wireless network, such as the TCN 410 as shown in FIG. 6 and FIG. 7. This secures bandwidth for operational telemetry on constrained links.

In some implementations, when the received signal drops below a predetermined signal strength on the main network, roaming to the auxiliary network may comprise scanning for available networks via the network interface and, upon failing to attach to the main wireless network including roaming partners, initiating attachment to the auxiliary wireless network, as depicted by decision nodes in FIG. 5 and transitions in FIG. 6. This improves resilience to coverage gaps.

In some implementations, the method is executed only when the IoT device 300 is powered by a wired power source detected by power module 370, and, when powered by a battery, the device operates in a battery reporting mode that transmits at lower frequencies independent of the auxiliary wireless network 470, as shown in FIG. 3 and FIG. 5. This ensures energy-appropriate operation.

In some implementations, the lot device 300 buffers debug and diagnostics data designated as priority-3 during operation on the auxiliary wireless network and uploads the buffered priority-3 data upon reconnection to the main wireless network in accordance with a configured policy, using memory 340 and controller 330 and delivered to server 430 as shown in FIG. 6 and FIG. 8. This improves post-event analysis without burdening the auxiliary link.

In some implementations, while on the auxiliary wireless network, dynamically adjusting the composition of the priority-1 data is based on a data budget, including pruning optional priority-1 fields and/or coalescing multiple events into summarized values, while retaining an instantaneous location indicator from GNSS receiver 350 and at least one critical indicator selected from ignition state via indicator signal 385, external line-in voltage via the power module 370, temperature via sensors 360, or device health via controller 330 as shown in FIG. 8. This ensures minimum situational awareness while adapting payload size to quota.

In some implementations, the main wireless network is a terrestrial cellular network 410 connected to core network 450 and server 430 as shown in FIG. 1 and FIG. 4.

In some implementations, the auxiliary wireless network is a DTC satellite network 470 comprised of Low Earth Orbit satellites interfacing to core network 450 and server 430 as shown in FIG. 4 and FIG. 6. This secures coverage in remote environments.

In another aspect of the present disclosure, there is provided an Internet-of-Things device comprising a network interface 320, a controller 330, and a memory 340 storing instructions that, when executed by the controller 330, cause the device to the received signal drops below a predetermined signal strength on the main wireless network and roam to an auxiliary wireless network, upon roaming to the auxiliary wireless network upload buffered data from memory 340, record a status indicating operation on the auxiliary wireless network via indicator interface 385, and prevent FOTA updates, while on the auxiliary wireless network at a configured interval upload priority-1 data and buffer trajectory GNSS data from GNSS receiver 350, and upon roaming back to the main wireless network 410 upload the buffered trajectory GNSS data and re-initialize standard reporting through core network 450 and server 430, all shown in FIGS. 3, 4, and 6. This improves continuity and bandwidth discipline across heterogeneous networks.

In some implementations, a power module 370 configured to detect wired power availability enables behavior for the auxiliary wireless network only when wired power is available, as shown in FIG. 3 and referenced in FIG. 5. This ensures higher reporting throughput only when energy is sufficient.

In some implementations, the network interface 320 is a 3GPP-compliant cellular modem of Category 1bis or higher attaching to 410 and 470 as shown in FIG. 3 and FIG. 4. This improves compatibility and performance.

In some implementations, a location module 350 is implemented as a GNSS receiver configured to provide instantaneous location indicators and trajectory GNSS data to controller 330, as shown in FIG. 3 and used across FIGS. 6-8. This ensures accurate positioning and path capture.

In some implementations, the memory 340 stores instructions to simplify trajectory GNSS data using a Ramer-Douglas-Peucker algorithm prior to buffering, executed by controller 330 on data from the location module 350 as referenced in FIG. 8. This improves deferred upload efficiency.

In some implementations, the controller 330 is further configured to obtain data-usage metrics from the modem in network interface 320 and enforce a configured monthly budget over the auxiliary wireless network 470, as shown in FIG. 8. This secures adherence to carrier limits and avoids loss of connectivity when the carrier limits are reached.

In some implementations, the controller 330 is further configured to maintain registration to the auxiliary wireless network 470 but schedule uplink transmissions only at the configured interval via network interface 320, as shown in FIG. 6 and FIG. 7. This reduces idle signaling overhead.

In some implementations, the uploaded priority-1 data includes at least an instantaneous location indicator from GNSS receiver 350 and at least one of ignition state via indicator signal 385, external line-in voltage via power module 370, temperature via sensors 360, or device health computed by controller 330, organized per FIG. 8. This ensures critical payload composition under constraints.

In some implementations, the memory 340 stores instructions that cause the controller 330, while on the auxiliary wireless network 470, to buffer debug and diagnostics data designated as priority-3 in non-volatile memory and, upon reconnection to the main wireless network, such as the TCN 410, to upload the buffered priority-3 data in accordance with a configured policy, as shown in FIG. 8 and FIG. 6. This improves diagnostics handling without impacting constrained uplinks.

In some implementations, the controller 330 is further configured, while on the auxiliary wireless network, such as the DTC satellite 470, to dynamically adjust the composition of priority-1 payloads responsive to a data budget by pruning optional priority-1 fields and/or coalescing multiple events into summarized values, while retaining an instantaneous location indicator and at least one critical indicator selected from ignition state via indicator signal 385, external line-in voltage via power module 370, temperature via sensors 360, or device health via controller 330, as governed in FIG. 8. This improves quota adherence while retaining essential awareness.

In some implementations, the main wireless network is a terrestrial cellular network 410 coupled to core network 450 and remote server 430 as shown in FIG. 1 and FIG. 4. This ensures a common deployment context.

In some implementations, the auxiliary wireless network is a DTC satellite network 470 comprised of Low Earth Orbit satellites interfaced to core network 450 and server 430 as shown in FIG. 4 and FIG. 6. This improves reach in remote areas.

In yet another aspect of the present disclosure, there is provided a system comprising the Internet-of-Things device 300 with network interface 320, controller 330, and memory 340, a main wireless network 410, an auxiliary wireless network 470 interconnected to a core network 450, and a server 430 configured to receive the recorded status indicating operation on the auxiliary wireless network via the network interface 320, receive periodic priority-1 data uploads while the device is on the auxiliary wireless network, and receive buffered trajectory GNSS data upon reconnection to the main wireless network, as shown in FIGS. 1, 2, and 4. This improves end-to-end ingestion, visualization, and reconciliation of realtime and deferred telemetry.

In some implementations, the server 430 is configured to display an auxiliary-network-in-use indicator in a user interface on an administration terminal 240 responsive to receiving the recorded status from indicator 385, as shown in FIG. 1 and FIG. 2. This ensures clear UI signaling for administrators 11 and fleet managers 211.

In some implementations, the server 430 is further configured to accept deferred uploads of trajectory GNSS data originating from memory 340 and controller 330 and to reconstruct a path visualization upon receipt of the buffered data. This improves historical path fidelity after constrained operation.

In some implementations, the server 430 enforces randomized staggering windows for auxiliary-network-originating uploads across a fleet of devices 300 to mitigate gateway congestion over the auxiliary wireless network such as the DTC satellite 470 and core network 450. This reduces peak contention and stabilizes ingress.

In some implementations, the server 430 stores configuration parameters defining the configured interval for uploads over the auxiliary wireless network for movement and stationary states and transmits the parameters to the device 300 via core network 450 and main or auxiliary wireless networks. This improves centralized cadence control aligned to asset activity.

In a further aspect of the present disclosure, there is provided that the main wireless network is a terrestrial cellular network 410 coupled to core network 450 and server 430, as shown in FIG. 1 and FIG. 4. This secures a widely deployed embodiment.

In a further aspect of the present disclosure, there is provided that the auxiliary wireless network is a DTC satellite network 470 comprised of Low Earth Orbit satellites interconnected to core network 450 and server 430, as shown in FIG. 4 and FIG. 6. This improves coverage continuity in remote regions.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

The invention claimed is:

1. A method for managing communication by an Internet-of-Things (IoT) device powered by a wired source, the method comprising:

establishing, via a network interface, a connection to a main wireless network;

when the received signal drops below a predetermined signal strength on the main network, roaming to the auxiliary network;

upon roaming to the auxiliary network: uploading data stored in a buffer to a remote server, recording a status indicating operation on the auxiliary wireless network, and preventing firmware-over-the-air (FOTA) updates; and while connected to the auxiliary wireless network: at a configured interval, uploading a first set of data comprising priority-1 data including at least an instantaneous location indicator, and buffering a second set of data comprising trajectory Global Navigation Satellite System (GNSS) data; and upon reconnection to the main wireless network, uploading the buffered second set of data.

2. The method of claim 1, wherein the configured interval is selected based on movement state, including:

while movement is detected, uploading the first set of data at a first interval; and while stationary, uploading the first set of data at a second interval;

wherein each interval is remotely configurable.

3. The method of claim 1, further comprising periodically attempting to reconnect to the main wireless network while connected to the auxiliary wireless network.

4. The method of claim 1, wherein buffering the trajectory GNSS data comprises simplifying the trajectory using a Ramer-Douglas-Peucker algorithm prior to storage.

5. The method of claim 1, wherein recording a status indicating operation on the auxiliary wireless network comprises emitting a first status indicator upon roaming to the auxiliary wireless network and a second status indicator upon resuming the main wireless network.

6. The method of claim 1, further comprising estimating data usage over the auxiliary wireless network based on payload size and a transport-overhead factor, and, upon reaching a threshold, reducing an upload cadence and/or restricting payload composition to remain within a configured budget.

7. The method of claim 1, further comprising enforcing a data budget over the auxiliary wireless network based on counters obtained from the network interface or a network service.

8. The method of claim 1, wherein while connected to the auxiliary wireless network the device maintains network registration but transmits uplinks only at the configured interval.

9. The method of claim 1, wherein while connected to the auxiliary wireless network the device disconnects and reconnects at each configured interval to reduce overhead between uplinks.

10. The method of claim 1, wherein the first set of data comprises priority-1 data that includes at least an instantaneous location indicator and at least one of ignition state, external line-in voltage, temperature, or device health.

11. The method of claim 1, further comprising applying per-device randomized staggering to scheduled transmissions over the auxiliary wireless network within a bounded tolerance to reduce gateway congestion.

12. The method of claim 1, further comprising, when a high-frequency reporting mode is enabled, maintaining priority-1-only payloads while decreasing the configured interval subject to a monthly data budget over the auxiliary wireless network.

13. The method of claim 1, wherein the device refrains from performing FOTA until after reconnection to the main wireless network and completion of uploading buffered data.

14. The method of claim 1, wherein when the received signal drops below a predetermined signal strength on the main network, roaming to the auxiliary network may comprise scanning for available networks via the network interface and, upon failing to attach to the main wireless network including roaming partners, initiating attachment to the auxiliary wireless network.

15. The method of claim 1, wherein the method is executed only when the device is powered by a wired power source detected by a power module, and, when powered by a battery, the device operates in a battery reporting mode that transmits at lower frequencies independent of the auxiliary wireless network.

16. The method of claim 1, wherein the device buffers debug and diagnostics data designated as priority-3 during operation on the auxiliary wireless network and uploads the buffered priority-3 data upon reconnection to the main wireless network in accordance with a configured policy.

17. The method of claim 1, further comprising, while on the auxiliary wireless network, dynamically adjusting the composition of the priority-1 data based on a data budget, including pruning optional priority-1 fields and/or coalescing multiple events into summarized values, while retaining an instantaneous location indicator and at least one critical indicator selected from ignition state, external line-in voltage, temperature, or device health.

18. The method of claim 1, wherein the main wireless network is a terrestrial cellular network (TCN).

19. The method of claim 1, wherein the auxiliary wireless network is a direct-to-cell satellite network comprised of Low Earth Orbit (LEO) satellites.

20. The method of claim 1, further comprising, upon reconnection to the main wireless network, re-initializing standard reporting and synchronizing configuration parameters received from a server to ensure alignment with main-network policies.

* * * * *